(12) United States Patent
Yura et al.

(10) Patent No.: US 9,902,143 B2
(45) Date of Patent: Feb. 27, 2018

(54) METHOD AND DEVICE FOR FORMING LAMINATED SUBSTRATE

(71) Applicant: NITTO DENKO CORPORATION, Ibaraki-shi, Osaka (JP)

(72) Inventors: Tomokazu Yura, Ibaraki (JP); Satoru Koshio, Ibaraki (JP); Takuya Nakazono, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 277 days.

(21) Appl. No.: 14/898,670

(22) PCT Filed: Mar. 20, 2014

(86) PCT No.: PCT/JP2014/057748
§ 371 (c)(1),
(2) Date: Apr. 5, 2016

(87) PCT Pub. No.: WO2014/174951
PCT Pub. Date: Oct. 30, 2014

(65) Prior Publication Data
US 2016/0243809 A1 Aug. 25, 2016

(30) Foreign Application Priority Data

Jul. 4, 2013 (JP) ................................. 2013-140298

(51) Int. Cl.
*B32B 38/10* (2006.01)
*B32B 27/00* (2006.01)
(Continued)

(52) U.S. Cl.
CPC .............. *B32B 38/10* (2013.01); *B32B 27/00* (2013.01); *B32B 27/06* (2013.01); *B32B 37/02* (2013.01);
(Continued)

(58) Field of Classification Search
CPC ..... B32B 37/12; B32B 38/0004; B32B 38/10; B32B 2037/268; B32B 2038/047;
(Continued)

(56) References Cited

U.S. PATENT DOCUMENTS

2009/0199950 A1* 8/2009 Kitada ............... B23K 26/0846
156/64
2011/0085125 A1* 4/2011 Kimura ................... B32B 41/00
349/187

(Continued)

FOREIGN PATENT DOCUMENTS

| JP | 2012128409 A | 7/2012 |
| JP | 2013047853 A | 3/2013 |
| JP | 2013122534 A | 6/2013 |
| JP | 2013228717 A | 11/2013 |
| WO | 2009128241 A1 | 10/2009 |

OTHER PUBLICATIONS

International Search Report for PCT/2014/057748 dated May 27, 2014, citing the above reference(s).
(Continued)

Primary Examiner — George Koch
(74) Attorney, Agent, or Firm — Hauptman Ham, LLP

(57) ABSTRACT

Disclosed are a method and an apparatus for forming a laminated substrate free from misalignment which would otherwise occur based on the assumption that, when the laminated substrate is formed by; preliminarily producing at least two rolls of laminate webs having different roll widths; and successively laminating at least two film sheets cut out, respectively, from the laminate webs being fed from the rolls, to one surface of a rectangular substrate, the roll width of each of the preliminarily-produced rolls of laminate webs becomes non-uniform.

23 Claims, 12 Drawing Sheets

(51) Int. Cl.
*B32B 27/06* (2006.01)
*B32B 37/14* (2006.01)
*B32B 37/02* (2006.01)
*B32B 37/12* (2006.01)
*B32B 37/26* (2006.01)
*B32B 38/04* (2006.01)

(52) U.S. Cl.
CPC .............. *B32B 37/14* (2013.01); *B32B 37/12* (2013.01); *B32B 2037/268* (2013.01); *B32B 2038/047* (2013.01); *B32B 2307/40* (2013.01); *B32B 2309/10* (2013.01); *B32B 2457/208* (2013.01); *B32B 2551/00* (2013.01)

(58) Field of Classification Search
CPC .......... B32B 2309/10; B32B 2457/202; B32B 2551/00; G02F 1/1303; G02F 2001/133354; G02F 2202/28
See application file for complete search history.

(56) References Cited

U.S. PATENT DOCUMENTS

| | | | | |
|---|---|---|---|---|
| 2012/0241077 | A1* | 9/2012 | Hada | G02F 1/1303 156/64 |
| 2015/0277162 | A1* | 10/2015 | Yura | B65H 37/002 156/64 |
| 2015/0306857 | A1* | 10/2015 | Yura | B32B 41/00 156/64 |
| 2015/0328870 | A1* | 11/2015 | Yura | G02F 1/1303 156/235 |

OTHER PUBLICATIONS

International Preliminary Report of Patentability dated Jan. 5, 2016 in connection with the counterpart International Patent Application No. PCT/JP2014/057748, citing the above reference(s).

\* cited by examiner ized to a polarizing film, and describes a technique of increasing need for realizing a narrower frame in a tablet
METHOD AND DEVICE FOR FORMING LAMINATED SUBSTRATE

CROSS REFERENCE TO RELATED APPLICATION

This application claims the priority of Japanese Patent Application No. 2013-140298, filed on Jul. 4, 2013 in the JIPO (Japanese Intellectual Property Office). Further, this application is the National Phase application of International Application No. PCT/JP2014/057748 filed Mar. 20, 2014, which designates the United States and was published in Japanese.

TECHNICAL FIELD

The present invention relates to a method and an apparatus for forming a laminate on one surface of a rectangular substrate. More specifically, the present invention relates to a method and an apparatus configured to: form at least two different types of film sheets each having a shape identical or similar to a rectangular shape of a rectangular substrate, from a first laminated web having a width corresponding to a long side of the rectangular substrate, and a second laminated web having a width corresponding to a short side of the rectangular substrate; and sequentially superimposingly laminate the film sheets to one surface of the rectangular substrate, to thereby form a laminated substrate.

BACKGROUND ART

The patent specifications of JP 4307510B (Patent Document 1) and JP 4451924B (Patent Document 2) disclose a method configured to: form two different types of polarizing film sheets, using a pair of polarizing film-containing laminate webs having respective widths corresponding to long and short sides of a liquid crystal display panel having a rectangular shape; and successively laminate the polarizing film sheets, respectively, on opposite surfaces of the liquid crystal display panel, in such a manner as to allow transmission axes of the polarizing sheets to orthogonally intersect each other, to produce a liquid crystal display device.

Further, each of JP 2009-271516A (Patent Document 3) and JP 2012-128409A (Patent Document 4) discloses a method and an apparatus configured to: sequentially unroll at least a pair of laminate webs; cut out at least two different types of film sheets, respectively, from the laminate webs; and sequentially superimposingly laminate the film sheets to one surface of a liquid crystal display panel having a rectangular shape, to form a laminate. In particular, the Patent Document 4 discloses a process comprising: attaching, to one surface of a liquid crystal display panel which is being conveyed in a posture where a short side of the liquid crystal display panel is oriented to serve as a leading edge thereof, a first film sheet formed from a laminate web having a width corresponding to the short side, in such a manner as to have a length corresponding to a long side of the liquid crystal display panel; and then superimposingly laminating, to an outer surface of the first film sheet on the liquid crystal display panel which is being conveyed in a posture where the long side of the liquid crystal display panel is oriented to serve as the leading edge, a second film sheet formed from a laminate web having a width corresponding to the long side, in such a manner as to have a length corresponding to the short side.

The Patent Document 3 proposes a retardation film to be laminated to a polarizing film, and describes a technique of laminating two or more types of retardation film sheets to control retardation-dependent optical properties or the like. A ¼ wavelength plate, a circularly polarizing plate and a display device produced in the above manner are disclosed in JP 2002-311239A (Patent Document 5).

As is clear from the above Patent Documents, generally, a substrate composing, but not limited to, an optical display device such as a liquid crystal display device incorporating a reflective polarizing film sheet is continuously produced by the following process. A reflective polarizing film is different from a normal absorptive polarizing film, in terms of structure and function. Specifically, in terms of a relationship between a direction of a transmission axis and a stretching direction, the reflective polarizing film is different from a normal absorptive polarizing film uniaxially stretched in a longitudinal direction thereof, by 90 degrees. Therefore, in a process for producing a liquid crystal display device incorporating a reflective polarizing film sheet, it is necessary to superimposingly laminate two different types of film sheets to form a laminate, on a non-viewing side of a liquid crystal display panel, in such a manner that respective transmission axes of an absorptive polarizing film sheet and the reflective polarizing film sheet become parallel to each other.

As above, in the process for producing such a liquid crystal display device, there is an unsolved technical problem in the steps of: continuously unrolling an absorptive polarizing film-containing laminate web and a reflective polarizing film-containing laminate web; cutting out an absorptive polarizing film sheet from the absorptive polarizing film-containing laminate web and attaching the absorptive polarizing film sheet to a non-viewing side of a liquid crystal display panel being conveyed; and then cutting out a reflective polarizing film sheet from the reflective polarizing film-containing laminate web, and, after turning the liquid crystal display panel by 90 degrees, superimposingly laminating the reflective polarizing film sheet to an outer surface of the absorptive polarizing film sheet on the liquid crystal display panel. There is the same technical problem in a process for producing an organic EL display device, which comprises the steps of: sequentially cutting out a circularly polarizing film sheet and a retardation film sheet, respectively, from a circularly polarizing film-containing laminate web and a retardation film-containing laminate web; and superimposingly laminating the retardation film sheet to an outer surface of the circularly polarizing film sheet to be attached to a viewing side of an organic EL display panel being conveyed.

The technical problem is that, in a process for producing two rolls of laminate webs to be used in pair, although there is a need for cutting each of the rolls to a width corresponding to a long or short side of a rectangular panel onto which a laminate is to be formed, it is actually difficult to accurately cut each of the rolls to a desired roll width, and thereby it is necessary to employ the step of cutting out film sheets using such rolls each of which is non-uniform in terms of roll width, and superimposingly laminating the film sheets together. There are two problem caused by the non-uniformity in roll width.

One of the problems is to meet a need for realizing a narrower frame in a display device by reducing a width of a non-display region formed along four sides of a display panel. In recent years, along with progress in polarization toward a larger size and a smaller size of a liquid crystal display, there is an increasing need for realizing a narrower frame in a large-size display and obviously there is also an increasing need for realizing a narrower frame in a tablet liquid crystal or organic EL display device which is subjected to further downsizing. Specifically, in the case where a laminate of two different optical film sheets is formed on a display panel, there occurs a situation where a short side of an optical film sheet cut out from one of a pair of laminate webs each of which is non-uniform in terms of width is not coincident with a short side of an optical film sheet cut out from the other laminate web in such a manner as to have a length corresponding to a short side of the display panel. It is not always easy to solve this problem by enhancing cutting accuracy in production of rolls. Therefore, it is necessary to realize a narrower frame of a display screen in a display device by making short sides or long sides of two different film sheets coincident with each other, on the assumption that each of two rolls to be used in pair becomes non-uniform in terms of roll width.

The other problem is that, in the case where a laminate is formed on one surface of a display panel by using two different first and second film sheets cut out, respectively, from laminate webs fed from two rolls which are used in pair and each of which is non-uniform in terms of roll width, if a size of the second film sheet superimposed on the first film sheet is greater than that of the first film sheet, and a pressure-sensitive adhesive layer of the second film sheet lies outside the first film sheet, a resulting display device becomes defective. This is a problem insoluble by a lamination accuracy inspection method disclosed, for example, in JP 2011-197281A (Patent Document 6) and JP 5022507B (Patent Document 7). Therefore, there has also been proposed an idea of forming the second film sheet to have a size less than that of the first film sheet. However, this solution must be inconsistent with fulfillment of the need for realizing a narrower frame.

CITATION LIST

Patent Document

Patent Document 1: JP 4307510B
Patent Document 2: JP 4451924B
Patent Document 3: JP 2009-271516A
Patent Document 4: JP 2012-128409A
Patent Document 5: JP 2002-311239A
Patent Document 6: JP 2011-197281A
Patent Document 7: JP 5022507B

SUMMARY OF INVENTION

Technical Problem

As mentioned above, the technical problem of the present invention is based on the assumption that, when a laminated substrate is formed by; preliminarily producing at least two rolls of laminate webs having different roll widths; and successively laminating at least two film sheets cut out, respectively, from the laminate webs, to one surface of a rectangular substrate, the roll width of each of the preliminarily-produced rolls of laminate webs inevitably becomes non-uniform due to production errors.

Specifically, for example, the first film sheet is cut out from a first laminated web unrolled from a roll thereof and having a width corresponding to a short side of the rectangular substrate, in such a manner as to have a length corresponding to a long side of the rectangular substrate. On the other hand, the second film sheet is cut out from a second laminated web unrolled from a roll thereof and having a width corresponding to the long side of the rectangular substrate, in such a manner as to have a length corresponding to the short side of the rectangular substrate.

Then, in a continuous process for forming a laminated substrate, the laminated substrate is formed by: a first step of laminating the first film sheet cut out from the first laminated web, to one surface of the substrate being conveyed; and a second step of turning the substrate by 90 degrees, and superimposingly laminating the second film cut out from the second laminated web, to an outer surface of the first film sheet laminated to the substrate.

In the above process, a length dimension (dimension in a feed direction) of the film sheet cut out from each of the first and second laminated webs can be determined by controlling a distance between adjacent slit lines to be formed in a corresponding one of the laminate webs. On the other hand, a width dimension (dimension in a width direction orthogonal to the feed direction) of the film sheet corresponds to a roll width of a corresponding one of the preliminarily-produced rolls of first and second laminated webs, so that it is impossible to control the width dimension during the continuous process for forming the laminated substrate.

In the case where the roll width of each of the preliminarily-produced rolls of first and second laminated webs is non-uniform, under a condition that the non-uniform roll width falls within a given tolerance, a film sheet having a side with a dimension corresponding to the non-uniform roll width will be cut out from the laminate web. For example, when a size of the second film sheet is greater than that of the first film sheet, it is inevitable that a pressure-sensitive adhesive layer of the second film sheet lies outside the first film sheet, even if the first and second film sheets are accurately laminated together without any positional deviation. As a result, the pressure-sensitive adhesive layer is exposed to the surface of the substrate. An optical display device using the resulting laminated substrate is highly likely to be evaluated as a defective product.

Therefore, instead of, in the step of preliminarily producing at least two rolls of laminate webs to be loaded in an apparatus for producing a laminated substrate, strictly controlling accuracy in an operation for cutting the rolls in such a manner that roll widths thereof have dimensions corresponding to respective ones of a long side and a short side of a rectangular substrate, it is an object of the present invention to provides: a method comprising the steps of measuring widths of at least two laminate webs continuously unrolled, respectively, from rolls thereof loaded in an apparatus for producing a laminated substrate, and forming two adjacent slit lines in each of the laminate webs, while controlling a roll width-dependent dimension of a resulting film sheet of each of the laminate webs, in such a manner that the measured width of one of the laminate webs becomes equal to a length of a film sheet of the other laminate web in a feed direction, and the measured width of the other laminate web becomes equal to a length of a film sheet of the one laminate web in the feed direction; and an apparatus for use in the method.

Solution to Technical Problem

The present invention relates to a method and an apparatus for sequentially laminating, to one surface of a rectangular substrate, at least two different types of film sheets each having a shape identical or similar to a rectangular shape of the substrate, to thereby form a laminated substrate.

According to a first aspect of the present invention, the method comprises the step of providing (at least) a first roll formed by winding a first laminated web constructed such that a first film continuously extending in a longitudinal direction thereof and having a width a corresponding to one of a long side and a short side of the substrate is laminated to at least a first carrier film through a pressure-sensitive adhesive layer, and a second roll formed by winding a second laminated web constructed such that a second film continuously extending in a longitudinal direction thereof and having a width b corresponding to the remaining one of the long side and the short side of the substrate is laminated to at least a second carrier film through a pressure-sensitive adhesive layer;

The method further comprises the step of performing, in a first feed line comprised in a lamination apparatus and loaded with the first roll, a process comprising: unrolling the first laminated web from the first roll; successively forming a plurality of slit lines each extending in a direction orthogonal to a feed direction of the first laminated web, in a region of the first laminated web on the first carrier film, in such a manner as to allow a distance between adjacent ones of the slit lines to become equal to a distance b1 corresponding to a preliminarily-measured width of the second laminated web, to thereby form, between the adjacent slit lines, a first film sheet including a pressure-sensitive adhesive layer piece; peeling the first film sheet including the pressure-sensitive adhesive layer piece, from the first laminated web; laminating the peeled first film sheet to the substrate transferred to the first feed line, through the pressure-sensitive adhesive layer piece; and transferring the resulting substrate to a second feed line.

The method further comprises the step of performing, in the second feed line comprised in the lamination apparatus and loaded with the second roll, a process comprising: unrolling the second laminated web from the second roll; successively forming a plurality of slit lines each extending in a direction orthogonal to a feed direction of the second laminated web, in a region of the second laminated web on the second carrier film, in such a manner as to allow a distance between adjacent ones of the slit lines to become equal to a distance a1 corresponding to a preliminarily-measured width of the first laminated web, to thereby form, between the adjacent slit lines, a second film sheet including a pressure-sensitive adhesive layer piece; peeling the second film sheet including the pressure-sensitive adhesive layer piece, from the second laminated web; and superimposingly laminating the peeled second film sheet to an outer surface of the first film sheet on the substrate transferred to the second feed line, through the pressure-sensitive adhesive layer piece.

As is easily assumed, the first laminated web usable in the method may be a type comprising a first surface protective film laminated to an outer surface of the first film, and the second laminated web usable in the method may be a type comprising a second surface protective film laminated to an outer surface of the second film. In use of these types, a first laminated sheet comprising the first film sheet and the first surface protective film sheet cut out from the first laminated web may be laminated to the substrate, and then, after peeling the first surface protective film from the first laminated sheet to expose the first film sheet, a second laminated sheet comprising the second film sheet and the second surface protective film sheet cut out from the second laminated web may be superimposingly laminated to the exposed first laminated sheet.

The substrate transferred to the first feed line may be conveyed in a posture where one of the long and short sides of the substrate is oriented to serve as a leading edge thereof, and the substrate transferred to the second feed line may be conveyed in a posture where the remaining one of the long and short sides of the substrate is oriented to serve as the leading edge thereof.

The distance b1 corresponding to a width of the second laminated web may be a value obtained by measuring a width of the second laminated web in the second roll loaded in the second feed line or it may be set to become a distance of not less than the preliminarily-measured width of the second laminated web. On the other hand, the distance a1 corresponding to a width of the first laminated web may be a value obtained by measuring a width of the first laminated web in the first roll loaded in the second feed line or it may be set to become a distance of not greater than the preliminarily-measured width of the first laminated web.

In the first aspect of the present invention, the substrate may be composed of an organic EL display panel. In this case, the first film and the second film may be composed, respectively, of a retardation film, and a polarizing film. The retardation film cut out from the first laminated web may be laminated to a viewing side of the organic EL display panel, and the polarizing film cut out from the second laminated web may be superimposingly laminated to an outer surface of the retardation film.

In the case where each of the retardation film including the pressure-sensitive adhesive layer and constituting the first laminated web, and the polarizing film including the pressure-sensitive adhesive layer and constituting the second laminated web, is preliminarily subject to inspection to detect a defect existing therein, the process to be performed in the first feed line may comprise, when a defect exists in the retardation film including the pressure-sensitive adhesive layer, forming an upstream slit line in the region of the first laminated web on the first carrier film, at a position spaced apart from a position of the defect on an upstream side in the feed direction by a given distance, to thereby form a first defective sheet between the upstream slit line and a downstream slit line formed just before the upstream slit line so as to allow the first defective sheet to be ejected from the first feed line without being laminated to the organic EL display panel.

Further, the process to be performed in the second feed line may comprise, when a defect exists in the polarizing film including the pressure-sensitive adhesive layer, forming an upstream slit line in the region of the second laminated web on the second carrier film, at a position spaced apart from a position of the defect on an upstream side in the feed direction by a given distance, to thereby form a second defective sheet between the upstream slit line and a downstream slit line formed just before the upstream slit line so as to allow the second defective sheet to be ejected from the second feed line without being laminated to the organic EL display panel.

In the first aspect of the present invention, the substrate may be composed of a liquid crystal display panel. In this case, the first film including the pressure-sensitive adhesive layer and laminated to the first carrier film therethrough, and the second film including the pressure-sensitive adhesive layer and laminated to the second carrier film therethrough, which are used in at least a pair, may be composed, respectively, of an absorptive polarizing film having a width corresponding one of a long side and a short side of the liquid crystal display panel and having an transmission axis in a direction orthogonal to a longitudinal direction thereof, and a reflective polarizing film having a width corresponding the remaining one of the long and short sides of the liquid crystal display panel and having an transmission axis in a longitudinal direction thereof. The process to be performed in the first feed line may comprise: forming an absorptive polarizing film sheet including a pressure-sensitive adhesive layer piece, between the adjacent slit lines in the region of the first laminated web on the first carrier film; peeling the absorptive polarizing film sheet including the pressure-sensitive adhesive layer piece, from the first carrier film; laminating the peeled absorptive polarizing film sheet to a non-viewing side of the liquid crystal display panel transferred to the first feed line, through the pressure-sensitive adhesive layer piece; and transferring the resulting liquid crystal display panel to the second feed line.

Further, the process to be performed in the second feed line may comprise: forming a reflective polarizing film sheet including a pressure-sensitive adhesive layer piece, between the adjacent slit lines in the region of the second laminated web on the second carrier film; peeling the reflective polarizing film sheet including the pressure-sensitive adhesive layer piece, from the second carrier film; and superimposingly laminating the peeled reflective polarizing film sheet to an outer surface of the absorptive polarizing film sheet laminated to the liquid crystal display panel transferred to the second feed line, through the pressure-sensitive adhesive layer piece, in such a manner to allow the transmission axis of the absorptive polarizing film sheet and the transmission axis of the reflective polarizing film sheet to become parallel to each other.

Then, an additional absorptive polarizing film sheet may be further laminated to a viewing side of the liquid crystal display panel, in such a manner that it has a transmission axis extending in orthogonal relation to the transmission axis of the absorptive polarizing film constituting the first laminated sheet formed on the non-viewing side of the liquid crystal display panel, thereby completing a liquid crystal device.

In the case where the absorptive polarizing film including the pressure-sensitive adhesive layer and constituting the first laminated web is preliminarily subject to inspection to detect a defect existing therein, the process to be performed in the first feed line may comprise, when a defect exists in the absorptive polarizing film including the pressure-sensitive adhesive layer, forming an upstream slit line in the region of the first laminated web on the first carrier film, at a position spaced apart from a position of the defect on an upstream side in the feed direction by a given distance, to thereby form a first defective sheet between the upstream slit line and a downstream slit line formed just before the upstream slit line so as to allow the first defective sheet to be ejected from the first feed line without being laminated to the liquid crystal display panel.

According to a second aspect of the present invention, there is provided an apparatus for sequentially laminating, to one surface of a rectangular substrate, at least two different types of film sheets each having a shape identical or similar to a rectangular shape of the substrate, to thereby form a laminated substrate The apparatus comprises a first feed line 10 and a second feed line 20, wherein the first feed line 10 is loaded with a first roll formed by winding a first laminated web constructed such that a first film continuously extending in a longitudinal direction thereof and having a width a corresponding to one of a long side and a short side of the substrate is laminated to at least a first carrier film through a pressure-sensitive adhesive layer, and the second feed line 20 is loaded with a second roll formed by winding a second laminated web constructed such that a second film continuously extending in a longitudinal direction thereof and having a width b corresponding to the remaining one of the long side and the short side of the substrate is laminated to at least a second carrier film through a pressure-sensitive adhesive layer.

The apparatus further comprises: a first station for lamination, provided in the first feed line at a position spaced apart from one end of the first feed line by a first given distance; a first substrate conveyance path provided in the first feed line to extend from the one end of the first feed line over the first given distance, and provided with a first conveyance device configured to convey the substrate toward the first station; a first film conveyance path provided with a first unrolling mechanism configured to unroll the first laminated web from the first roll to convey the first laminated web toward the first station; a first slitting mechanism provided in the first film conveyance path and configured to successively form a plurality of slit lines each extending in a direction orthogonal to a feed direction of the first laminated web, in a region of the first laminated web on the first carrier film, in such a manner as to allow a distance between adjacent ones of the slit lines to become equal to a distance b1 corresponding to a preliminarily-measured width of the second laminated web, to thereby form, between the adjacent slit lines, a first film sheet including a pressure-sensitive adhesive layer piece; a first lamination device provided in the first station, wherein the first lamination device is provided with a first peeling mechanism for peeling the first film sheet from the first laminated web and configured to laminate the peeled first film sheet to one surface of the substrate conveyed to the first station to thereby form an intermediate laminated substrate;

The apparatus further comprises: an inter-path transfer section provided with an intermediate conveyance device configured to transfer the resulting intermediate laminated substrate to the second feed line; a second station for lamination, provided in the second feed line at a position spaced apart from one end of the second feed line by a second given distance; a second film conveyance path provided with a second unrolling mechanism configured to unroll the second laminated web from the second roll to convey the second laminated web toward the second station; a second slitting mechanism provided in the second film conveyance path and configured to successively form a plurality of slit lines each extending in a direction orthogonal to a feed direction of the second laminated web, in a region of the second laminated web on the second carrier film, in such a manner as to allow a distance between adjacent ones of the slit lines to become equal to a distance a1 corresponding to a preliminarily-measured width of the first laminated web, to thereby form, between the adjacent slit lines, a second film sheet including a pressure-sensitive adhesive layer piece; a second lamination device provided in the second station, wherein the second lamination device is provided with a second peeling mechanism for peeling the second film sheet from the second laminated web and configured to superimposingly laminate the peeled second film sheet to an outer surface of the intermediate laminated substrate conveyed to the second station to thereby form a laminated substrate; and a second substrate conveyance path provided with a second conveyance device configured to convey the laminated substrate.

The apparatus may comprise further a controller configured to interlockingly operate each of the first conveyance device, the first unrolling mechanism, the first slitting mechanism, the first lamination device, the intermediate conveyance device, the second unrolling mechanism, the second slitting mechanism, the second lamination device, and the second conveyance device.

In this apparatus, the intermediate conveyance device may comprise a turning device for turning the intermediate laminated substrate by 90 degrees.

In the second aspect of the present invention, the substrate may be composed of an organic EL display panel. In this case, the first film and the second film may be composed, respectively, of a retardation film and a polarizing film. This apparatus may be configured to laminate the retardation film cut out from the first laminated web, to a viewing side of the organic EL display panel, and then superimposingly laminate the polarizing film cut out from the second laminated web, to an outer surface of the retardation film.

In the case where each of the retardation film including the pressure-sensitive adhesive layer and constituting the first laminated web, and the polarizing film including the pressure-sensitive adhesive layer and constituting the second laminated web, is preliminarily subject to inspection to detect a defect existing therein, the apparatus may be operable, in the first feed line when a defect exists in the retardation film including the pressure-sensitive adhesive layer, to cause the first slitting mechanism to, based on information about a position of the defect preliminarily stored in a storage device, form an upstream slit line in the region of the first laminated web on the first carrier film, at a position spaced apart from the position of the defect on an upstream side in the feed direction by a given distance, to thereby form a first defective sheet between the upstream slit line and a downstream slit line formed just before the upstream slit line; and to cause a first ejection device provided interlockingly with the first lamination device to eject the first defective sheet from the first feed line 10 without laminating the first defective sheet to the organic EL display panel, Further, the apparatus may be operable, in the second feed line when a defect exists in the polarizing film including the pressure-sensitive adhesive layer, to cause the second slitting mechanism to, based on information about a position of the defect preliminarily stored in a storage device, form an upstream slit line in the region of the second laminated web on the second carrier film, at a position spaced apart from the position of the defect on an upstream side in the feed direction by a given distance, to thereby form a second defective sheet between the upstream slit line and a downstream slit line formed just before the upstream slit line; and to cause a second ejection device provided interlockingly with the second lamination device to eject the second defective sheet from the second feed line 20 without laminating the second defective sheet to the organic EL display panel.

In the second aspect of the present invention, the substrate may be composed of a liquid crystal display panel. In this case, the first film and the second film may be composed, respectively, of an absorptive polarizing film having an transmission axis in a direction orthogonal to a longitudinal direction thereof, and a reflective polarizing film having an transmission axis in a longitudinal direction thereof, wherein the apparatus may be configured to laminate the absorptive polarizing film sheet cut out from the first laminated web, to a non-viewing side of the liquid crystal display panel, and superimposingly laminate the reflective polarizing film cut out from the second laminated web, to an outer surface of the absorptive polarizing film sheet.

In the case where the absorptive polarizing film including the pressure-sensitive adhesive layer and constituting the first laminated web is preliminarily subject to inspection to detect a defect existing therein, wherein the apparatus may be operable, in the first feed line when a defect exists in the absorptive polarizing film including the pressure-sensitive adhesive layer, to cause the first slitting mechanism to, based on information about a position of the defect preliminarily stored in a storage device, form an upstream slit line in the region of the first laminated web on the first carrier film, at a position spaced apart from the position of the defect on an upstream side in the feed direction by a given distance, to thereby form a defective sheet between the upstream slit line and a downstream slit line formed just before the upstream slit line; and to cause a first ejection device provided interlockingly with the first lamination device to eject the defective sheet from the first feed line without laminating the defective sheet to the liquid crystal display panel.

BEST MODE FOR IMPLEMENTING THE PRESENT INVENTION

Figure 1:
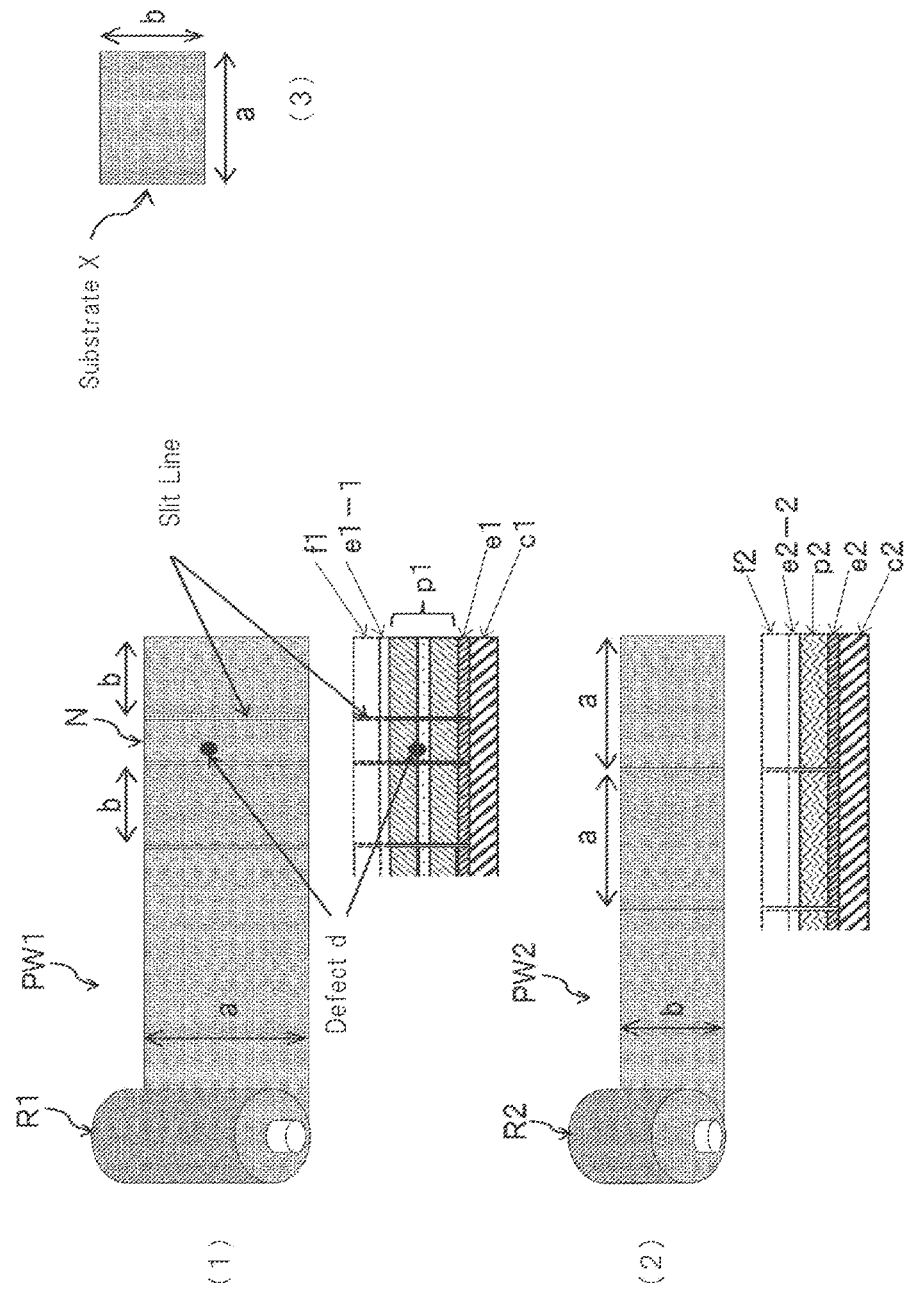
FIG. 1 depicts a first laminated web unrolled from a first roll, a second laminated web unrolled from a second roll, and a rectangular substrate, each for use in one embodiment of the present invention, wherein FIGS. 1(1), 1(2) and 1(3) are, respectively, a set of a top plan view and a partially enlarged side view of the first laminated web, a set of a top plan view and a partially enlarged side view of the second laminated web, and a top plan view of the rectangular substrate.

FIGS. 1(1) and 1(2) are schematic diagrams depicting two different rolls: a first roll R1 of a first laminated web PW1; and a second roll R2 of a second laminated web PW2, to be loaded in a lamination apparatus 1 for forming a laminated substrate A, implementing a method according to the present invention. FIG. 1(3) depicts a rectangular substrate having a long side a and a short side b.

As depicted in FIG. 1(1), the first laminated web PW1 is constructed such that a first film p1 continuously extending in a longitudinal direction thereof and having a width corresponding to the long side a of the rectangular substrate X is laminated to at least a first carrier film c1 through a pressure-sensitive adhesive layer e1, and unrolled from the wide-width first roll R1. Additionally, a first surface protective film f1 may be laminated thereto through a pressure-sensitive adhesive layer e1-1.

As depicted in FIG. 1(2), the second laminated web PW2 is constructed such that a second film p2 continuously extending in a longitudinal direction thereof and having a width corresponding to the short side b of the rectangular substrate X is laminated to at least a second carrier film c2 through a pressure-sensitive adhesive layer e2, and unrolled from the narrow-width second roll R2. Additionally, a second surface protective film f2 may also be laminated thereto through a pressure-sensitive adhesive layer e2-2.

FIG. 1(1) also depicts a region of a defective sheet N to be formed by two adjacent slit lines, in such a manner that a preliminarily detected defect d exists in the first film p1 or in the first film p1 and the pressure-sensitive adhesive layer e1 on the first film p1. In this embodiment, the first film p1 constituting the first laminated web PW1 is assumed to be an absorptive polarizing film. The region of the defective sheet N depicted in FIG. 1(1) corresponds to a region continuously extending in the longitudinal direction and having a width corresponding to the long side a of the rectangular substrate X and a length x (generally, x<b) defined by a longitudinal distance between an upstream slit line to be formed at a position spaced apart from a position of the defect d on an upstream side in a feed direction of the first film p1 by a given distance, and a downstream slit line to be formed just before the upstream slit line.

Figure 2:
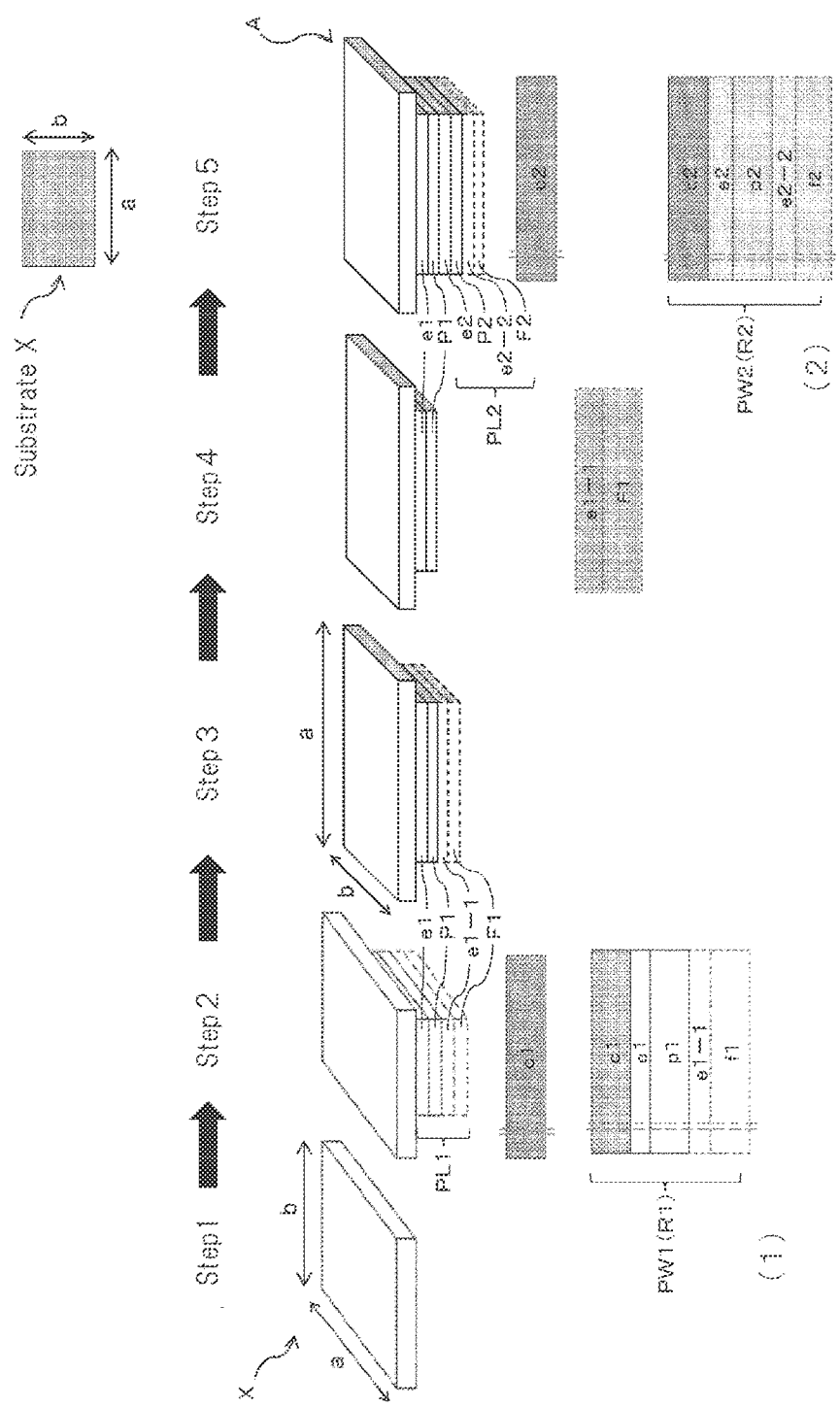
FIG. 2 is a schematic diagram depicting a process for use in one embodiment of the present invention, wherein the process is configured to sequentially laminating two different types of film sheets to one surface (lower surface) of a rectangular substrate, through steps 1 to 5, wherein the film sheets are composed of a first laminated web formed to have a width corresponding to one of a long side and a short side of the rectangular substrate and laminated to a first carrier film, and a second laminated web formed to have a width corresponding to the remaining one of the long and short sides and laminated to a second carrier film.

FIG. 2 schematically depicts steps 1 to 5. It depicts that the method according to the present invention the steps of: providing a first roll R1 of a first laminated web PW1 comprising a first fi comprises 1$m$ p1 having a relatively wide width corresponding to a long side a of a rectangular substrate X, and a second roll R2 of a second laminated web PW2 comprising a second film p1 having a relatively narrow width corresponding to a short side b of the rectangular substrate X; performing, in the lamination apparatus 1 for forming a laminated substrate A, a process comprising: unrolling the first laminated web PW1; forming, in a region of the first laminated web PW1 on a first carrier film c1, a first film sheet P1 having a feed directional length corresponding to the short side b of the rectangular substrate X; and laminating the first film sheet P1 to one surface of the rectangular substrate X conveyed in a posture where the long side a thereof is oriented to serve as a leading edge thereof, through a pressure-sensitive adhesive layer piece e1.

And also it shows that the process further comprises: continuously unrolling the second laminated web PW2; turning the rectangular substrate X having the first film sheet P1 laminated thereto, by 90 degrees; forming, in a region of the second laminated web PW2 on a second carrier film c2, a second film sheet P2 having a feed directional length corresponding to the long side a of the rectangular substrate X; and laminating the second film sheet P2 on the outer surface of the first film sheet P1 laminated to the one surface of the rectangular substrate X conveyed in a posture where the short side b thereof is oriented to serve as a leading edge thereof, through a pressure-sensitive adhesive layer piece e2.

A first laminated sheet PL1 comprising the first film sheet P1 to be laminated to the one surface of the rectangular substrate X is formed from the first laminated web PW1 comprising the first film p1, depicted in FIG. 1(1). A second laminated sheet PL2 comprising the second film sheet P2 to be laminated to an outer surface of the first film sheet P1 of the first laminated sheet PL1 is formed from the second laminated web PW2 comprising the second film p2, depicted in FIG. 1(2). The first laminated web PW1 depicted in FIG. 1(1) comprises the pressure-sensitive adhesive layer e1 and the first film p1, wherein the first carrier film c1 is bonded to the pressure-sensitive adhesive layer e1. Further, the first surface protective film f1 is laminated to a surface of the first film p1 on a side opposite to the first carrier film c1, through the pressure-sensitive adhesive layer e1-1. Therefore, when the second laminated sheet PL2 comprising the second film sheet P2 is laminated to the outer surface of the first film sheet P1, it is necessary to provide the step of peeling a first surface protective film sheet F1 constituting the first laminated sheet PL1. The second laminated web PW2 depicted in FIG. 1(2) comprises: the second film p2 which is assumed to be a reflective polarizing film; and the pressure-sensitive adhesive layer e2 and the second surface protective film f2 including the pressure-sensitive adhesive layer e2-2, located on respective opposite sides of the second film p2, wherein the second carrier film c2 is bonded to the pressure-sensitive adhesive layer e2.

As above, the two-stage lamination process is employed. This makes it possible to laminate two identically or similarly-shaped film sheets P1, P2 formed from the laminate web PW1, PW2 having different widths, to the rectangular substrate X in serial steps. More specifically, such a process can be described by the steps 1 to 5 depicted in FIG. 2.

In the step 1, the rectangular substrate X is conveyed in a posture where the long side a thereof is oriented to serve as a leading edge thereof. In the step 2, the first laminated sheet PL1 formed in the first laminated web PW1 is peeled from the first carrier film c1, and laminated to one surface (e.g., back surface) of the rectangular substrate X. In the step 3, the rectangular substrate X is turned by 90 degrees. In the step 4, the rectangular substrate X is conveyed in a posture where the short side b of the substrate X is oriented to serve as the leading edge thereof.

The step 4 also depicts a state after only the first surface protective film sheet F1 including a pressure-sensitive adhesive layer piece e1-1 is peeled from the first laminated sheet PL1 formed on the first carrier film c1 of the first laminated web PW1 and composed of the first film sheet P1 including the pressure-sensitive adhesive layer piece e1 and the first surface protective film sheet F1 including a pressure-sensitive adhesive layer piece e1-1.

In the step 5, the second laminated sheet PL2 formed on the second carrier film c2 of the second laminated web PW2 is peeled from the second carrier film c2. Then, the second laminated sheet PL2 composed of the second film sheet P2 including the pressure-sensitive adhesive layer piece e2 and a second surface protective film sheet F2 including a pressure-sensitive adhesive layer piece e2-2 is laminated to the outer surface of the first film sheet P1 on the rectangular substrate X, through the pressure-sensitive adhesive layer piece e2. As a result, a laminate comprising the first film sheet P1 and the second film sheet P2 having the second surface protective film sheet F2 laminated thereto is formed on one surface (e.g., back surface) of the rectangular substrate X. That is, in the step 5, a laminated substrate is formed.

Figure 3:
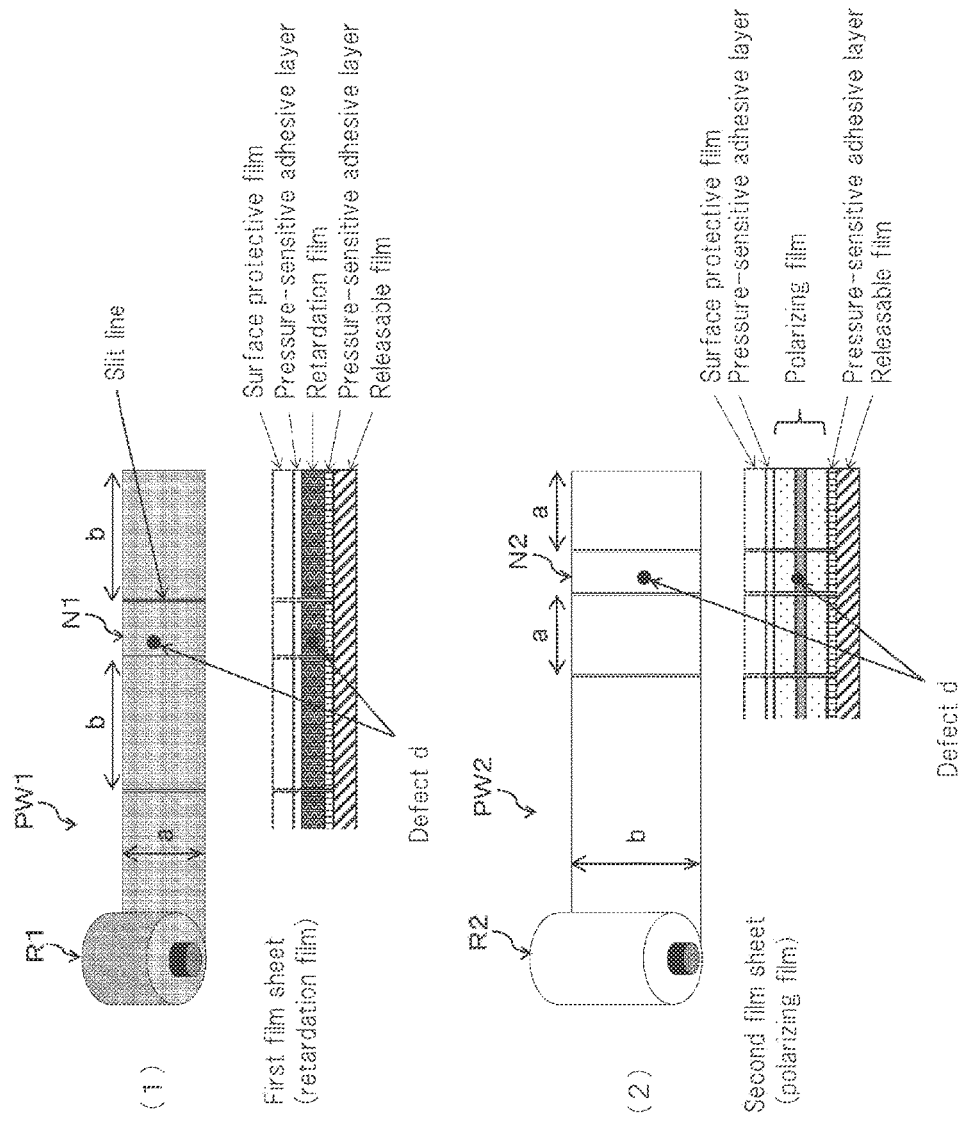
FIG. 3 depicts a first laminated web comprising a retardation film having a relatively narrow width corresponding to a short side of a rectangular substrate and a polarizing film having a relatively wide width corresponding to a long side of the rectangular substrate, each for use in one embodiment of the present invention, wherein FIGS. 3(1) and 3(2) are, respectively, a set of a top plan view and a partially enlarged side view of the retardation film in an unrolled state, and a set of a top plan view and a partially enlarged side view of the polarizing film in an unrolled state.
Figure 4:
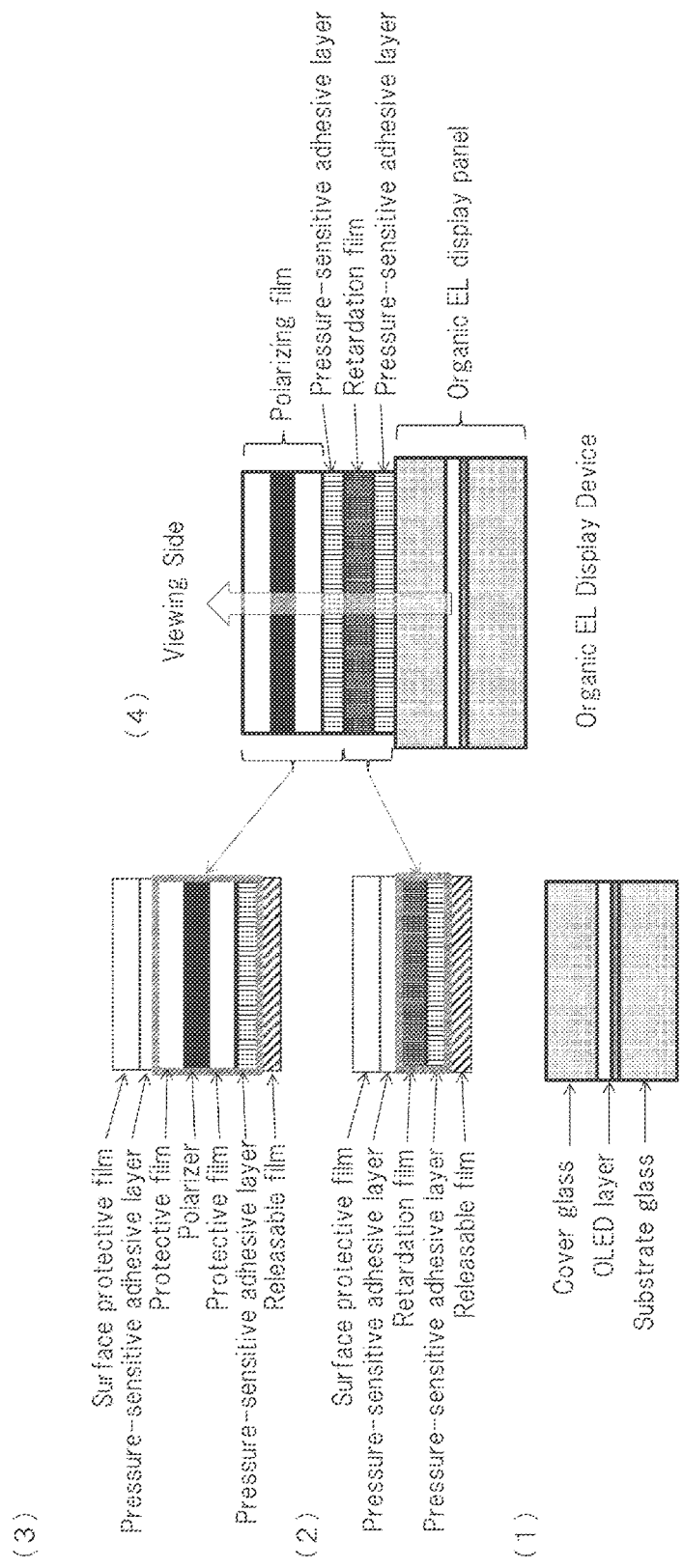
FIG. 4 depicts a structure of an organic EL display device for use in one embodiment of the present invention.

FIG. 3 depicts a state in which, from a first roll R1 of a first laminated web PW1 comprising a retardation film p1 having a relatively narrow width corresponding to a short side a of a rectangular substrate X, and a second roll R2 of a second laminated web PW2 comprising a polarizing film p2 having a relatively wide width corresponding to a long side b of the rectangular substrate X, the first laminated web PW1 and the second laminated web PW2 are unrolled. FIG. 3 is a schematic diagram based on an assumption that two different rolls: the first roll R1 of the first laminated web PW1; and the second roll R2 of the second laminated web PW2, are loaded in a lamination apparatus 1 for producing an organic EL display device. FIG. 4 is a structure of the organic EL display device. Details thereof will be described later.

Figure 5:
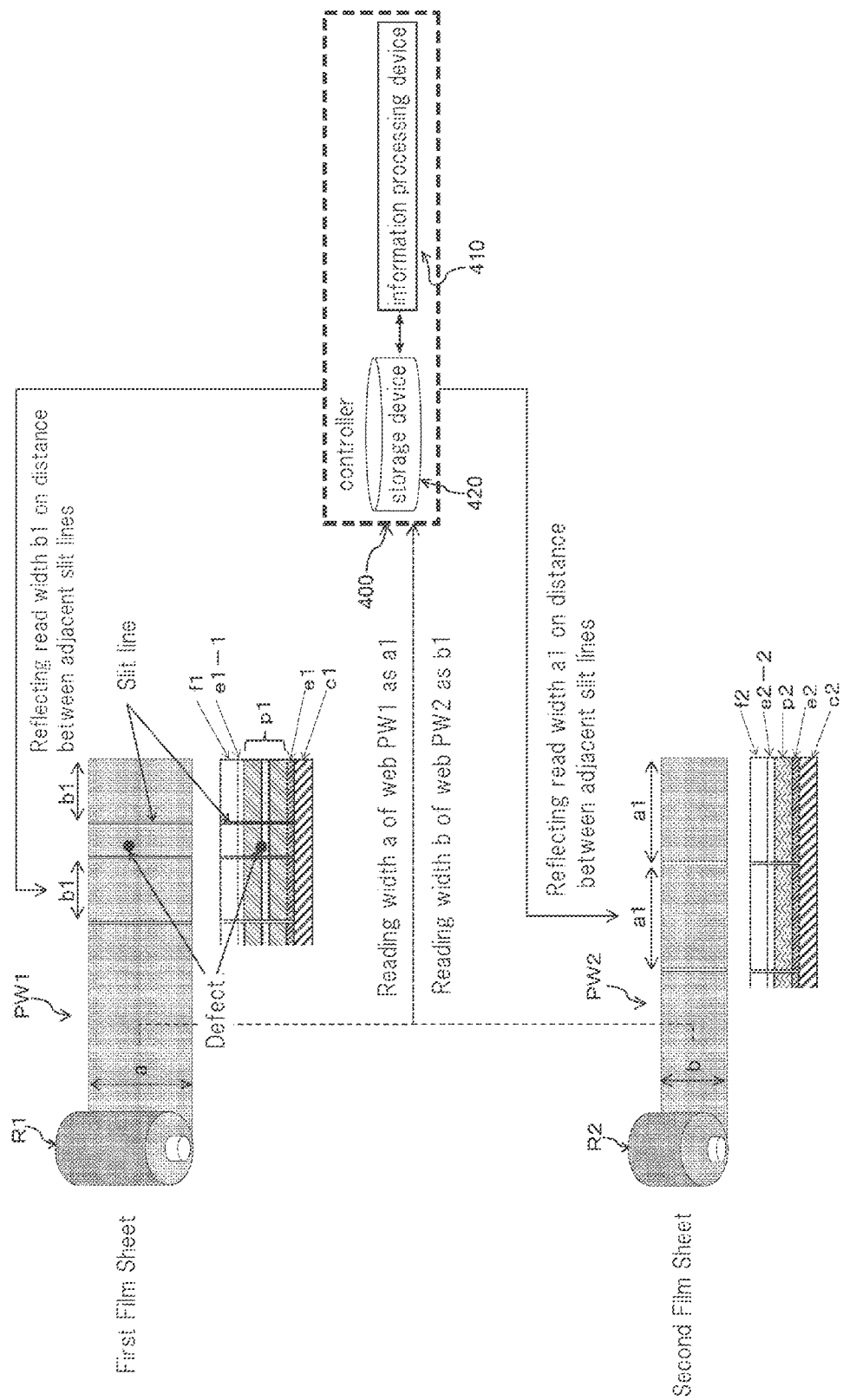
FIG. 5 is a conceptual diagram depicting a control process for use in a method and an apparatus for forming a laminate on one surface of a rectangular substrate, according to one embodiment of the present invention, wherein the control process is configured to control a length between adjacent slit lines to be formed in each of a first laminated web with a relatively wide width and a second laminated web with a relatively narrow width, unrolled, respectively, from a first roll and a second roll having different roll widths, to thereby form two rectangular film sheets each having a shape identical or similar to that of a rectangular substrate.

FIG. 5 is a conceptual diagram depicting a control process, in a lamination apparatus 1 for sequentially laminating a first film sheet P1 having a relatively wide width corresponding to a long side a of a rectangular substrate X and a second film sheet P2 having a relatively narrow width corresponding to a short side b of the rectangular substrate X on a surface of the rectangular substrate X to thereby form a laminated substrate, according to one embodiment of the present invention, wherein the control process is configured to control a length between adjacent slit lines to be formed in each of a first laminated web PW1 having a relatively wide width and a second laminated web PW2 having a relatively narrow width, continuously unrolled, respectively, from a wide-width first roll R1 and a narrow-width second roll R2 each loaded in the lamination apparatus 1, to thereby form two identically or similarly-shaped film sheets P1, P2. In case where at least one of the rectangular film sheets is formed in a similar shape, the second film sheet P2 is set to a size less than that of the first film sheet P1

More specifically, the lamination apparatus 1 is operable to read widths of the first and second laminated webs PW1, PW2 continuously unrolled, respectively, from the wide-width first roll R1 and the narrow-width second roll R2, i.e., read the width a of the first laminated web PW1 as a measured value a1, and read the width b of the second laminated web PW2 as a measured value b1. The measured values are stored in a storage device 420 constituting the controller 400 of the lamination apparatus 1.

The lamination apparatus 1 is operable to control a length (distance) between adjacent ones of a plurality of slit lines formed in a region of the unrolled first laminated web PW1 on the first carrier film c1, i.e., a length of the rectangular film sheet in a feed direction of the first laminated web PW1, in such a manner as to allow the length (distance) to become equal to a measured value b1 of the narrow-width second laminated web PW2, and control a length (distance) between adjacent ones of a plurality of slit lines formed in a region of the unrolled second laminated web PW2 on the second carrier film c2, i.e., a length of the rectangular film sheet in a feed direction of the second laminated web PW2, in such a manner as to allow the length (distance) to become equal to a measured value a1 of the wide-width first laminated web PW1.

This makes it possible to form the identically or similarly-shaped first and second film sheets P1, P2, respectively, in the first and second laminated webs PW1, PW2 having two different widths, i.e., a relatively wide width and a relatively narrow width, without the concurrence of a problem due to non-uniformity in roll width of each of the preliminarily produced first and second rolls.

Figure 6:
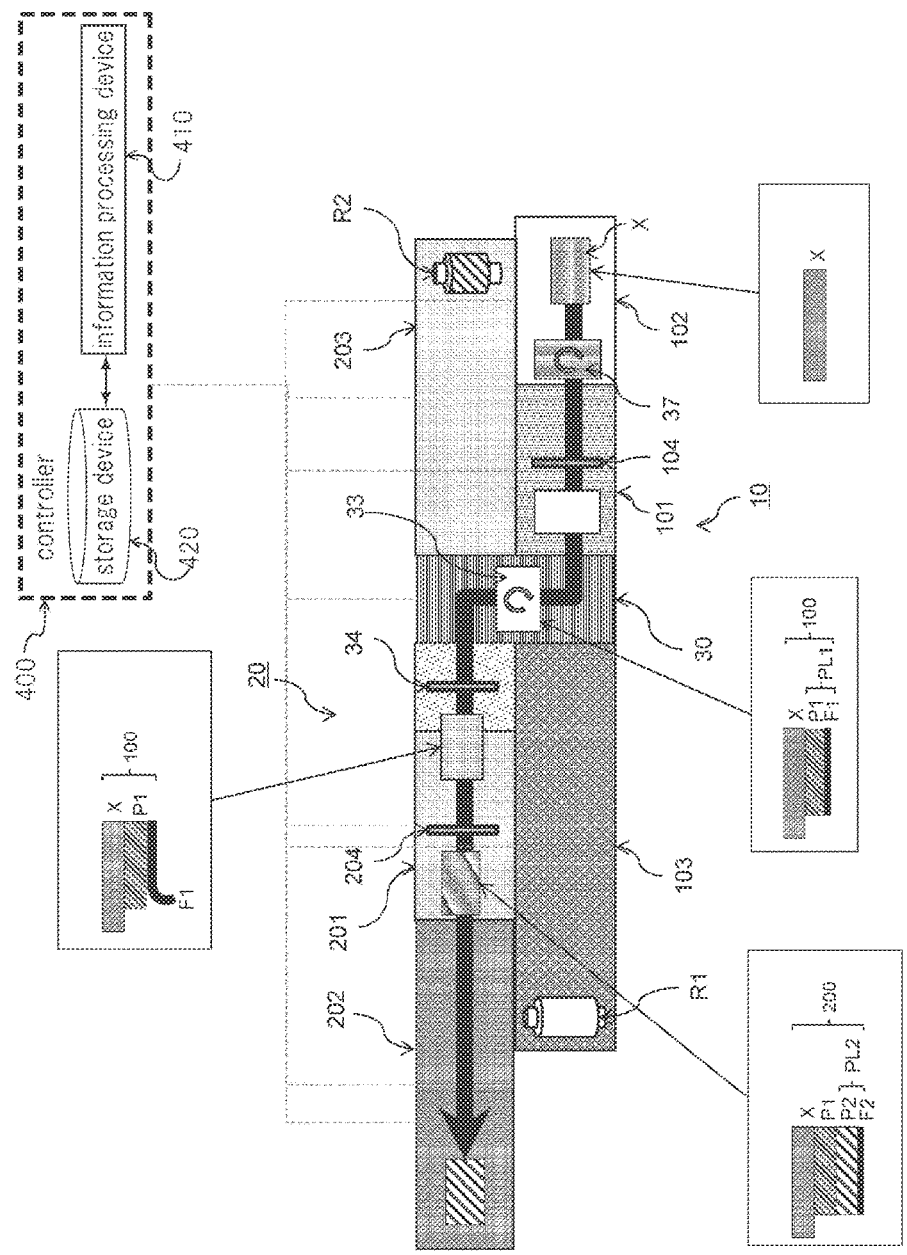
FIG. 6 is a top plan view schematically depicting a first feed line loaded with a first roll and a second feed line loaded with a second roll in a lamination apparatus for forming a laminate on one surface of a rectangular substrate, according to one embodiment of the present invention, wherein the lamination apparatus is configured to: cut out a first film sheet from a first laminated web unrolled from a first roll; laminate the first film sheet to one surface of the rectangular substrate; turn the rectangular substrate having the first film sheet laminated thereto, by 90 degrees; cut out a second film sheet from a second laminated web unrolled from a second roll; and superimposingly laminate the second film sheet to the first film sheet on the rectangular substrate turned by 90 degrees and transferred to the second feed line, to thereby form a laminate on the one surface of the rectangular substrate.
Figure 7:
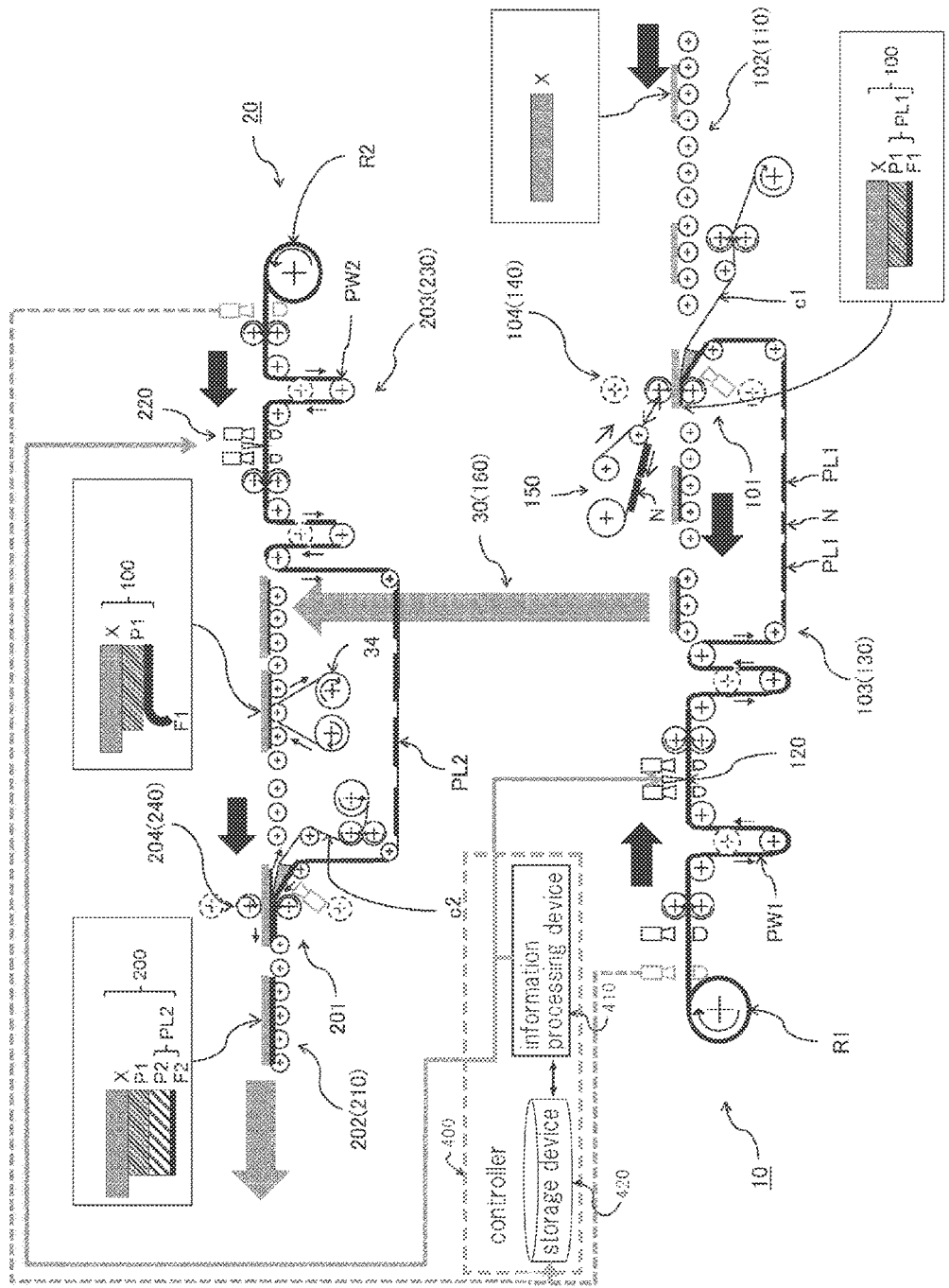
FIG. 7 is a schematic side view of the first and second feed lines of the lamination apparatus depicted in FIG. 6.

FIG. 6 is a top plan view schematically depicting a lamination apparatus 1 for forming a laminate on one surface of a rectangular substrate X, according to one embodiment of the present invention. FIG. 7 is a schematic side view of the first and second feed lines 10, 20 of the lamination apparatus 1.

The lamination apparatus 1 is designed to sequentially laminate at least two different types of film sheets P1, P2 each having a shape identical or similar to a rectangular shape of the rectangular substrate X, on one surface of the rectangular substrate X, to thereby form a laminated substrate product 200.

Referring to FIGS. 6 and 7, the lamination apparatus 1 comprises: a first feed line 10 and a second feed line 20, wherein the first feed line 10 is loaded with a first roll R1 formed by winding a wide-width first laminated web PW1 constructed such that a first film p1 continuously extending in a longitudinal direction thereof and having a width a1 corresponding to a long side a of a rectangular substrate X is laminated to at least a first carrier film c1 through a pressure-sensitive adhesive layer, and wherein the second feed line 20 is loaded with a second roll R2 formed by winding a second laminated web PW2 constructed such that a second film p2 continuously extending in a longitudinal direction thereof and having a width b1 corresponding to a short side b of the rectangular substrate X is laminated to at least a second carrier film c2 through a pressure-sensitive adhesive layer.

The lamination apparatus 1 further comprises:

a first station 101 for lamination, provided in the first feed line 10 at a position spaced apart from one end of the first feed line 10 by a first given distance;

a first substrate conveyance path 102 provided in the first feed line 10 to extend from the one end of the first feed line 10 over the first given distance, and provided with a first conveyance device 110 configured to convey the rectangular substrate X toward the first station 101;

a first film conveyance path 103 provided with a first unrolling mechanism 130 configured to unroll the first laminated web PW1 from the first roll R1 to convey the first laminated web PW1 toward the first station 101;

a first slitting mechanism 120 provided in the first film conveyance path 103 and configured to successively form a plurality of slit lines each extending in a direction orthogonal to a feed direction of the first laminated web PW1, in a region of the first laminated web PW1 on the first carrier film c1, in such a manner as to allow a distance between adjacent ones of the slit lines to become equal to a distance b1 corresponding to a preliminarily-measured width of the second laminated web PW2, to thereby form, between the adjacent slit lines, a first film sheet P1 including a pressure-sensitive adhesive layer piece; and a first lamination device 104 provided in the first station 101, wherein the first lamination device 104 is provided with a first peeling mechanism 140 for peeling the first film sheet P1 from the first laminated web PW1 and configured to laminate the peeled first film sheet P1 to one surface of the rectangular substrate X conveyed to the first station 101 in a posture where the long side a is oriented to serve as a leading edge thereof, to thereby form an intermediate laminated substrate 100.

The lamination apparatus 1 further comprises:

an inter-path transfer section 30 provided with an intermediate conveyance device 160 configured to transfer the resulting intermediate laminated substrate 100 to the second feed line 20;

a second station 201 for lamination, provided in the second feed line 20 at a position spaced apart from one end of the second feed line 20 by a second given distance;

a second film conveyance path 203 provided with a second unrolling mechanism 230 configured to unroll the second laminated web PW2 from the second roll R2 to convey the second laminated web PW2 toward the second station 201;

a second slitting mechanism 220 provided in the second film conveyance path 203 and configured to successively form a plurality of slit lines each extending in a direction orthogonal to a feed direction of the second laminated web PW2, in a region of the second laminated web PW2 on the second carrier film c2, in such a manner as to allow a distance between adjacent ones of the slit lines to become equal to a distance a1 corresponding to a preliminarily-measured width a of the first laminated web, to thereby form, between the adjacent slit lines, a second film sheet P2 including a pressure-sensitive adhesive layer piece;

a second lamination device 204 provided in the second station 201, wherein the second lamination device 204 is provided with a second peeling mechanism 240 for peeling the second film sheet P2 from the second laminated web PW2 and configured to laminate superimposingly the peeled second film sheet PW2 to an outer surface of the first film sheet P1 on the intermediate laminated substrate 100 conveyed to the second station in a posture where a short side b of the intermediate laminated substrate 100 is oriented to serve as the leading edge thereof, to thereby form a laminated substrate product 200; and a second substrate conveyance path 202 provided with a second conveyance device 210 configured to convey the laminated substrate product 200.

The lamination apparatus 1 may further comprise a controller 400 configured to interlockingly operate the first conveyance device 110, the first unrolling mechanism 130, the first slitting mechanism 120, the first lamination device 104, the intermediate conveyance device 160, the second unrolling mechanism 230, the second slitting mechanism 220, the second lamination device 204, and the second conveyance device 210.

Figure 8:
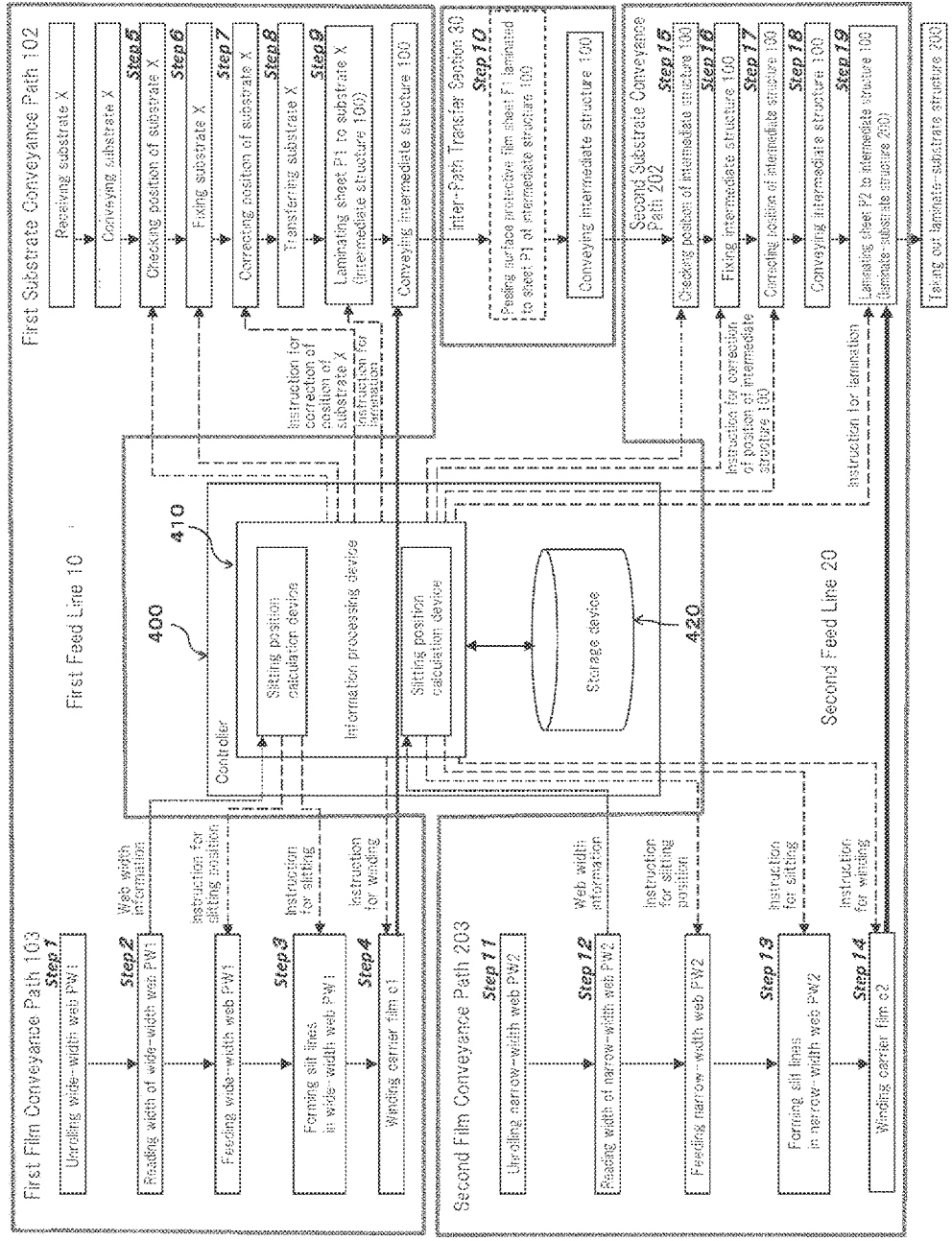
FIG. 8 is a flow diagram of control for a process to be performed in the first and second feed lines comprised in the lamination apparatus, schematically depicted in FIGS. 6 and 7.

FIG. 8 includes a flow diagram of control for a process to be performed in the first feed line 10 comprised in the lamination apparatus 1 for forming a laminated substrate A, i.e., a laminated substrate product 200, schematically depicted in FIGS. 6 and 7. More specifically, FIG. 8 includes a flow diagram of control for a process to be performed in the first feed line 10, wherein the process comprises: the step of, after reading the width a of the first laminated web PW1 unrolled from the first roll R1 loaded on one side, recording the read width in the storage device 420 as a value a1 indicative of a slitting span, and calculating a slitting position for forming a second laminated sheet PL2 comprising a second film sheet P2; the step of forming a first laminated sheet PL1 comprising a first film sheet P1, in the first laminated web PW1 being unrolled; and the step of laminating the first laminated sheet PL1 comprising the first film sheet P1, on one surface of a rectangular substrate X conveyed from the other side to the first station 101 in a posture where the long side a thereof is oriented to serve as a leading edge thereof.

FIG. 8 also includes a flow diagram of control for a process to be performed in the second feed line 20 comprised in the lamination apparatus 1 for forming a laminated substrate A, i.e., a laminated substrate product 200. More specifically, FIG. 8 includes a flow diagram of control for a process to be performed in the second feed line 20, wherein the process comprises: the step of, after reading the width b of the second laminated web PW2 unrolled from the second roll R2 loaded on one side, recording the read width in the storage device 420 as a value b1 indicative of a cut length, and calculating a slitting position for forming the first laminated sheet PL1 comprising the first film sheet P1; the step of forming the second laminated sheet PL2 comprising the second film sheet P2, in the second laminated web PW2 being unrolled; the step of peeling the first surface protective film sheet F1 comprised in the first laminated sheet PL1 laminated to the one surface of the rectangular substrate X in the first feed line 10, to thereby expose the first film sheet P1; and the step of laminating the second laminated sheet PL2 comprising the second film sheet P2, to the exposed outer surface of the first film sheet P1 laminated to the one surface of the rectangular substrate X.

Figure 9:
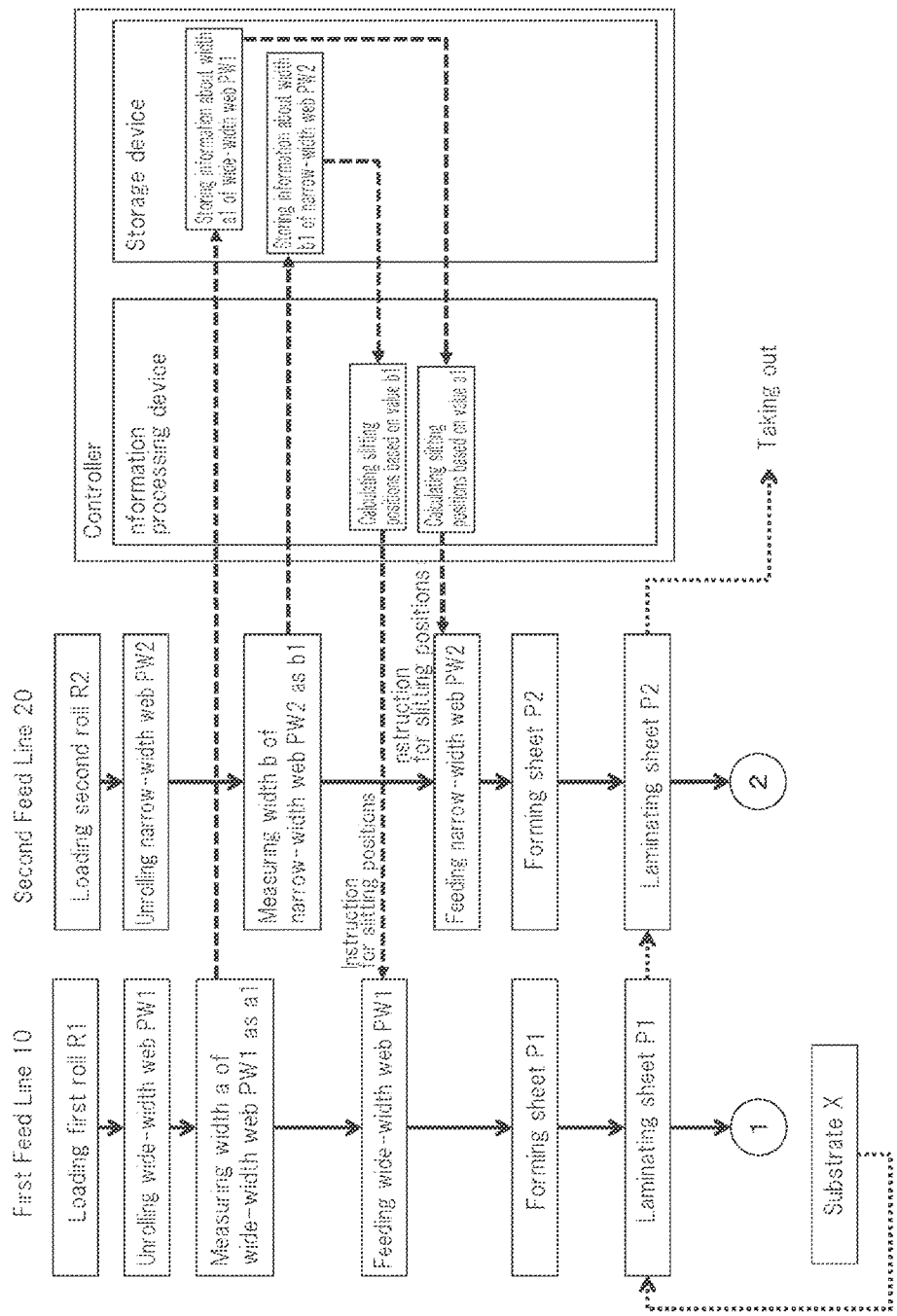
FIG. 9 is a flow diagram of control for a process for use in one embodiment of the present invention, wherein the process is configured to, when a rectangular substrate passes through a second feed line loaded with a second roll after being transferred from a first feed line loaded with a first roll thereto via an inter-path transfer section, as depicted in FIG. 8, laminate a first film sheet to one surface of the rectangular substrate and then superimposingly laminate a second film sheet to an outer surface of the first film sheet to thereby form a laminated substrate.

FIG. 9 is a conceptual diagram depicting a control process for use in the lamination apparatus 1 for forming a laminated substrate A, i.e., an laminated substrate product 200, wherein the control process is configured to form a laminate of a first film sheet P1 and a second film sheet P2 on one surface of the rectangular substrate X when a rectangular substrate X passes through the second feed line 20 loaded with the second roll R2 after being transferred from the first feed line 10 loaded with the first roll R1 thereto.

That is, FIG. 9 depicts the steps of: cutting out a first laminated sheet PL1 comprising a first film sheet P1, according to slitting positions calculated based on the stored value b1 corresponding to the width b of the narrow-width second laminated web PW2, and laminating the first laminated sheet PL1 to one surface of a rectangular substrate X conveyed to the first station 101 along the first feed line 10, in a posture where a long side a thereof is oriented to serve as a leading edge thereof; and cutting out a second laminated sheet PL2 comprising a second film sheet P2, according to slitting positions calculated based on the stored value a1 corresponding to the width a of the wide-width first laminated web PW1, and laminating the second laminated sheet PL2 to an outer surface of the first film sheet P1 comprised in an intermediate laminated substrate 100 conveyed from the first feed line 10 to the second feed line 20, in a posture where the short side b of the intermediate laminated substrate 100 is oriented to serve as the leading edge thereof, whereby a laminate comprising at least the first film sheet P1 and the second film sheet P2 is formed on the one surface of the rectangular substrate X.

As is apparent from FIG. 9, preferably, upon activating the lamination apparatus 1, the width b of the second laminated web PW2 is measured and stored in the storage device 420 as a value b1, and then a first laminated sheet PL1 is cut out from the first laminated web PW1 according to slitting positions calculated based on the stored value b1 of the second laminated web PW2, and initially subjected to lamination to the rectangular substrate.

In the lamination apparatus 1 for forming a laminated substrate A, i.e., an laminated substrate product 200, according to one embodiment of the present invention, generally, a wide-width roll R1 and a narrow-width roll R2 in use are not simultaneously replaced, except during activation of the lamination apparatus 1.

Figure 10:
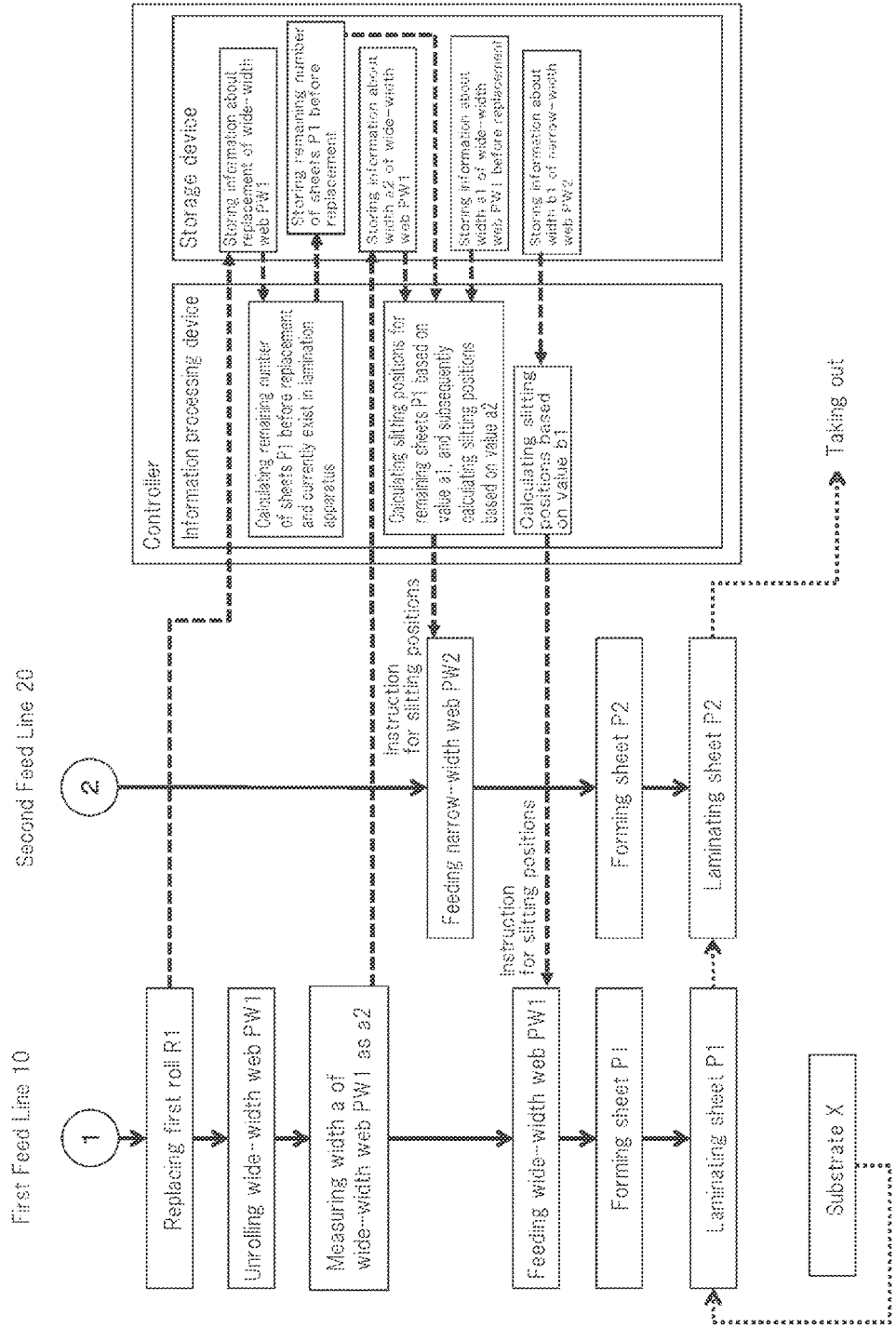
FIG. 10 is a flow diagram of control for a process to be performed in the first feed line and the second feed line comprised in the lamination apparatus depicted in FIG. 9, wherein the process is configured to, when the first roll and the second roll to be used in pair are not simultaneously replaced, e.g., only the first roll loaded in the first feed line is replaced and the second roll is still in use, calculating a remaining number of first film sheets which have been formed using the first roll before the replacement and are connected to a newly-loaded first roll, and reflecting a measured width of the first laminated web of the replaced first roll on a second film sheet to be formed from the second laminated web of the second roll in use.

FIG. 10 depicts a control process based on an assumption that, due to replacement of the wide-width roll R1 and the narrow-width roll R2, except during activation of the lamination apparatus 1, respective measured values of the width a of the first laminated web PW1 and the width b of the second laminated web PW2 become different from those before the replacement.

In a specific example, as regards dimensions of a rectangular shape of a first film sheet P1 to be cut out from the wide-width first laminated web PW1, a length thereof in the feed direction is determined based on b1 corresponding to the width b of the narrow-width second laminated web PW2. However, in a production process of the roll R2 of the narrow-width second laminated web PW2, actually measured values of rolls R2 slit based on slitting positions for 200 mm width generally have a distribution ranging from 198 to 202 mm width. On the other hand, as regards dimensions of a rectangular shape of a second film sheet P2 to be cut out from the narrow-width second laminated web PW2, a length thereof in the feed direction is determined based on a1 corresponding to the width a of the wide-width first laminated web PW1. In this case, however, in a production process of the roll R1 of the wide-width first laminated web PW1, actually measured values of rolls R1 slit based on slitting positions for 400 mm width generally have a distribution ranging from 398 to 402 mm width.

Thus, for example, when a timing of replacing the first roll R1 in the first feed line 10 comes, the control process in FIG. 10 is configured to calculate and store a remaining number of first laminated sheets PL1 (e.g., 398 mm width) before the replacement which are connected to a replaced or newly-loaded first roll R1-1 (e.g., 402 mm width), and reflect the stored information when a second laminated sheet PL2 is formed from the second laminated web PW2.

More specifically, when a timing of replacing the first roll R1 in the first feed line 10 of the lamination apparatus 1 comes, a remaining number of 398 mm-width first laminated sheets PL1 which have been formed in the first laminated web PW1 (measured width: 398 mm) before the replacement and are connected to a replaced first laminated web PW1-1 unrolled from the newly-loaded 402 mm-width first roll R1-1, is calculated and recorded in the storage device, based on the number of first film sheets P1 which have already been formed and the length of the first laminated web PW1 (which have already unrolled), and reflected on formation of a second laminated sheet PL2 in the second laminated web PW2 (e.g., 198 mm width) unrolled from the second roll R2 in the second feed line 20 of the lamination apparatus 1. That is, within a remaining number of the first laminated sheets PL1, the second laminated sheet PL2 is formed in a rectangular shape having a feed directional length of 398 mm and a width of 198 mm. When a lamination operation for a remaining number of the first laminated sheets PL1 before the replacement is completed, the measured width 402 mm of the newly-loaded, 402 mm-width first laminated web PW1-1 is reflected on formation of a second laminated sheet PL2 in the second laminated web PW2. That is, subsequently, the second laminated sheet PL2 can be formed in a rectangular shape having a feed directional length of 402 mm and a width of 198 mm. The second roll R2 has been not replaced even now. Thus, a first laminated sheet PL1 is formed in a rectangular shape having a feed directional length of 198 mm and a width of 402 mm, in synchronization with the second laminated sheet PL2.

Figure 11:
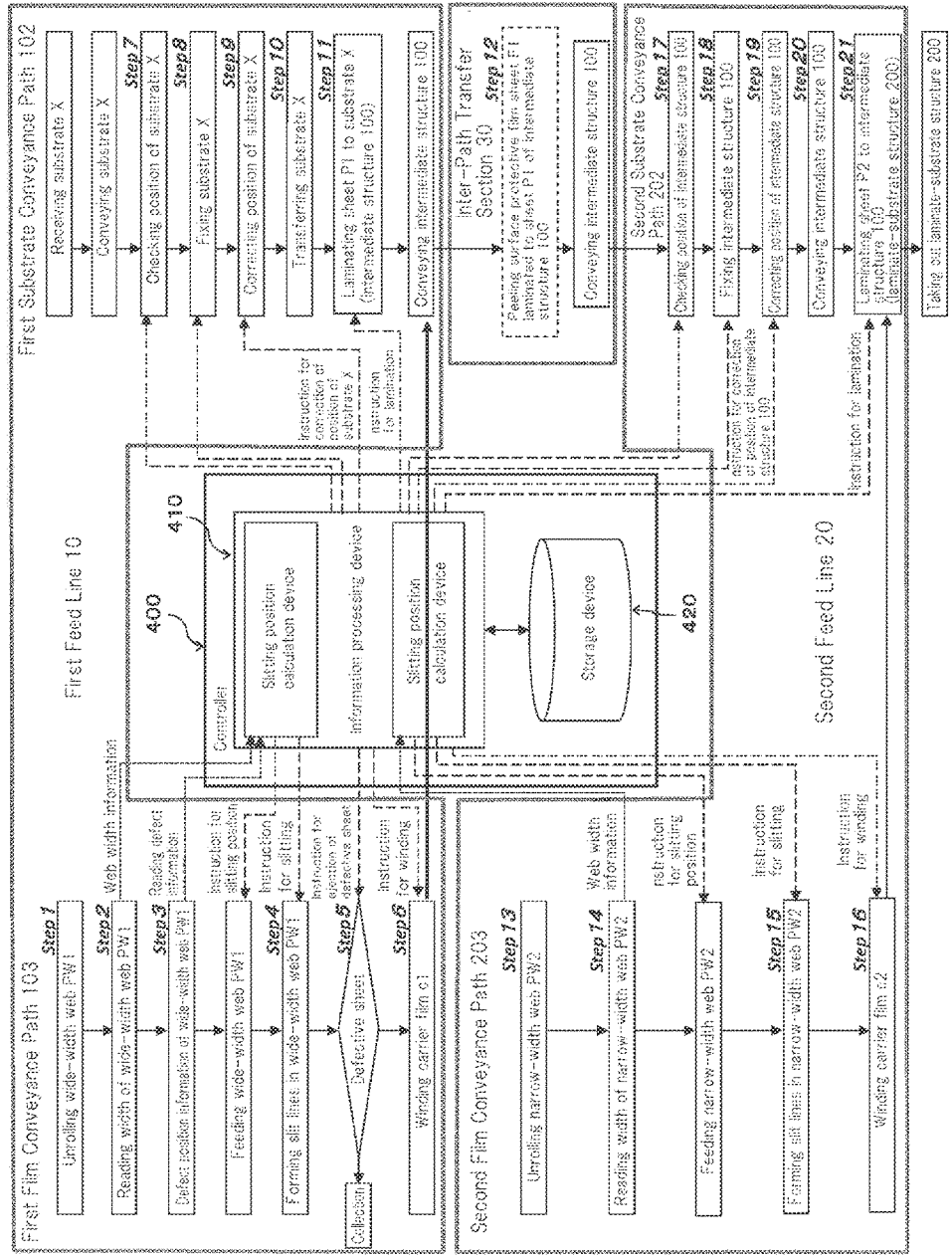
FIG. 11 is a flow diagram of control for a process comprising the step of, in the case where a defect existing in a first laminated web of a first roll to be used as one of a pair is preliminarily detected, ejecting a defective sheet containing the defect from the first feed line, without laminating the defective sheet to one surface of a rectangular substrate.

FIG. 11 depicts a control flow based on an assumption that a laminate of an absorptive polarizing film sheet P1 and a reflective polarizing film sheet P2 is formed on a non-viewing side of a liquid crystal display panel X for use in a liquid crystal display device in such a manner as to allow respective transmission axes of the absorptive polarizing film sheet P1 and the reflective polarizing film sheet P2 to become parallel to each other.

In the case where a defect d causing a defective region in a liquid crystal display device exists in an absorptive polarizing film p1 including a pressure-sensitive adhesive layer and constituting a first laminated web PW1, in one embodiment of the present invention, as depicted in FIG. 1(1), in addition to the step of forming the laminate on a non-viewing side of a liquid crystal display panel X, the control flow further includes the steps of: reading a position of a defect d existing in the first laminated web PW1 and recording positional information such as a distance n from a leading edge of the first laminated web PW1, in the storage device 420; forming a defective sheet N in the first laminated web PW1 and separating the defective sheet N from first laminated sheets PL1; and collecting the separated defective sheet N without laminating it to the liquid crystal display panel X. On the other hand, a reflective polarizing film including a pressure-sensitive adhesive layer and constituting a second laminated web PW2 as depicted in FIG. 1(2) is designed to reflect a light component capable of being absorbed and equivalent to 50% of incident light from a light source provided on the non-viewing side of the liquid crystal display panel X, by interfaces between respective ones of a plurality of layers arranged in such a manner as to be alternately changed differently in terms of refractive index, to thereby effectively utilize the light component so as to provide enhanced brightness. Therefore, there is not any region equivalent to a defective region causing degradation of a display screen as in the absorptive polarizing film p1.

As is clear from FIG. 11, in the first film conveyance path 103, the wide-width first laminated web PW1 is unrolled in step 1, and, in step 3, a position of a defect d existing in the first laminated web PW1, e.g., a value of the distance n from the leading edge of the first laminated web PW1, is recorded in the storage device 420. Then, in step 4, two adjacent slit lines for a defective sheet N are formed based on the recorded value n, and, in step 5, the defective sheet N is peeled from the first laminated web PW1 and collected without being laminated to the liquid crystal display panel X.

On the other hand, in the first substrate conveyance path 102, in step 10, a first laminated sheet PL1 cut out in the step 4 and containing no defect d is laminated to the non-viewing side of the liquid crystal display panel X conveyed to the first station 101 in a posture where the long side of the liquid crystal display panel X is oriented to serve as the leading edge thereof, in step 11, to thereby form an intermediate laminated substrate 100. The first laminated sheet PL1 containing no defect d is cut out in the first film conveyance path 103, and an intermediate laminated substrate 100 is converted to the second substrate conveyance path 202 via the inter-path transfer section 30. In this process, the first surface protective film sheet F1 is peeled from the first laminated sheet PL1 comprised in the intermediate laminated substrate 100 to expose an outer surface of an absorptive polarizing film sheet P1, and, in this state, the intermediate laminated substrate 100 is transferred to the second station, in step 20.

In response to this operation, in the second film conveyance path 203, the narrow-width second laminated web PW2 having no defective region is unrolled in step 13, and a second laminated sheet PL2 is cut out in step 15. In synchronization with the above operation, in the second substrate conveyance path 202, the intermediate laminated substrate 100 being conveyed toward the second station 201 is turned by 90 degrees, and conveyed in a posture where the short side of the intermediate laminated substrate 100 is oriented to serve as the leading edge thereof. In the second station 201, the second laminated sheet PL2 is laminated to an outer surface of the absorptive polarizing film sheet P1 of the intermediate laminated substrate 100, in step 21. In this way, the absorptive polarizing film sheet P1 and the reflective polarizing film sheet P2 comprised in the second laminated sheet PL2 are laminated together in such a manner as to allow respective absorption axes of the absorptive and reflective polarizing film sheets P1, P2 to become parallel to each other.

Figure 12:
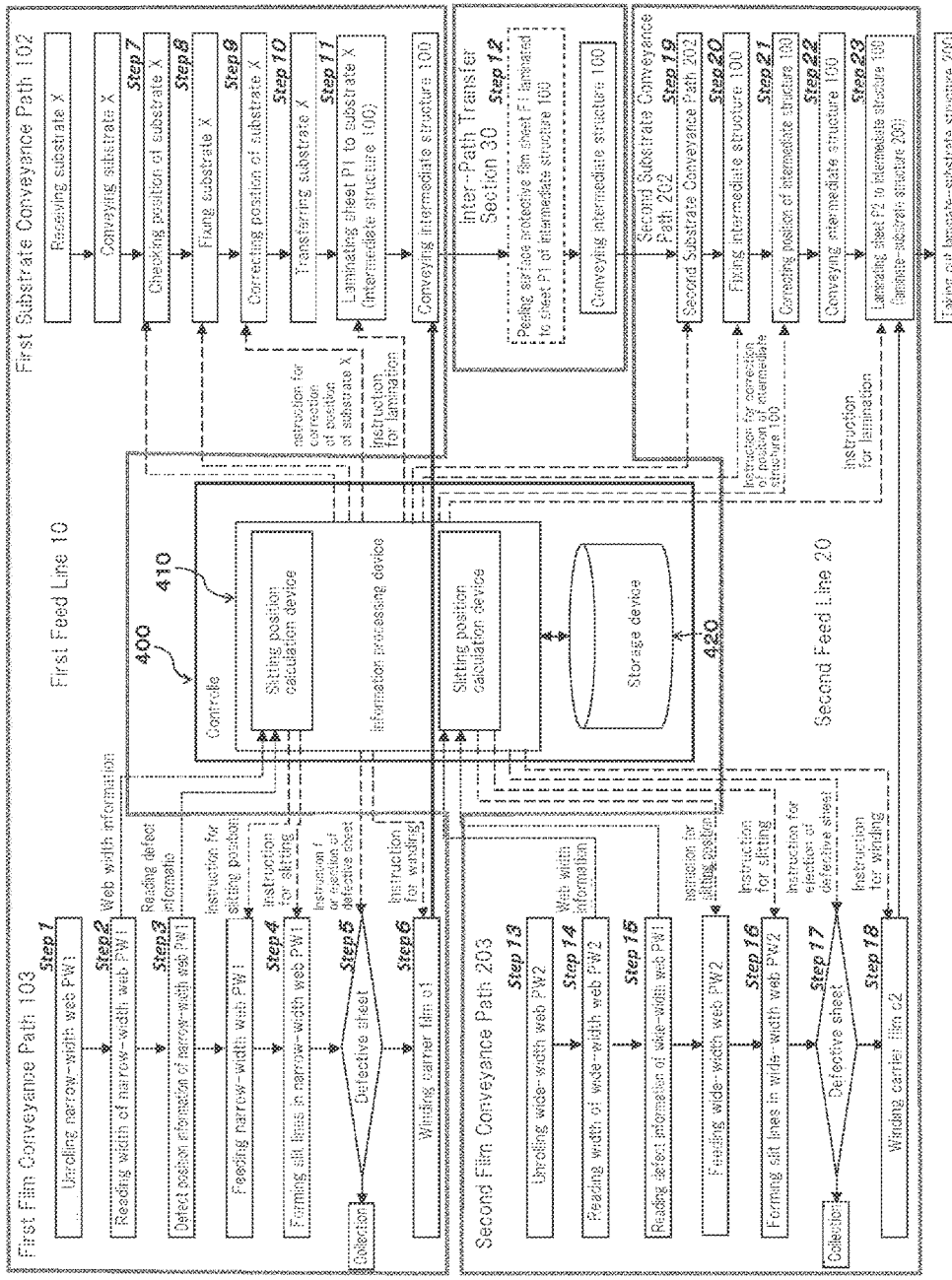
FIG. 12 is a flow diagram of control for a process comprising the steps of, in the case where a defect existing in each of a first laminated web of a first roll and a second laminated web of a second roll to be used in pair is preliminarily detected: ejecting a first defective sheet containing the defect, from the first feed line without laminating the first defective sheet to one surface of a rectangular substrate; and ejecting a second defective sheet containing the defect, from the second feed line without laminating the second defective sheet to an outer surface of a first film sheet laminated to the one surface of the rectangular substrate.

FIG. 12 depicts a control flow based on an assumption that a laminate of a retardation film sheet P1 and a polarizing film sheet P2 is formed on a viewing side of an organic EL display panel for use in an organic EL display device. As is clear from FIG. 4(4), the organic EL display device is constructed such that film sheets cut out from the retardation film and the polarization film are laminated to an organic EL display panel having no light source section on a non-viewing side where an OLED layer is formed on a substrate glass depicted in FIGS. 4(1) to 4(3).

As depicted in FIGS. 3(1) and 3(2), in the case where a defect d1 and a defect d2 each causing a defective region in an organic EL display device exist in both of the retardation film p1 including a pressure sensitive adhesive layer constituting a first laminated web PW1, and the polarizing film p1 including a pressure-sensitive adhesive layer constituting a second laminated web PW2, in other embodiment of the present invention, the control flow includes the steps of: forming the laminate on a viewing side of an organic EL display panel X; reading a position of a defect d1 existing in the first laminated web PW1 and recording positional information such as a distance n1 from a leading edge of the first laminated web PW1, in the storage device 420; forming a defective sheet N1 in the first laminated web PW1 and separating the defective sheet N1 from first laminated sheets PL1; and collecting the separated defective sheet N1 without laminating it to the organic EL display panel X.

The control flow further includes the steps of: laminating a second laminated sheet PL2 cut out from the second laminated web PW2 to a retardation film sheet P1 comprised in the first laminated sheet PL1 laminated to the viewing side of the organic EL display panel X to thereby form a laminate on the viewing side of the organic EL display panel X; reading a position of a defect d2 existing in the second laminated web PW2 and recording positional information such as a distance n2 from a leading edge of the second laminated web PW2, in the storage device 420; forming a defective sheet N2 in the second laminated web PW2 and separating the defective sheet N2 from second laminated sheets PL2; and collecting the separated defective sheet N2 without laminating it to the organic EL display panel X.

As is clear from FIG. 12, in the first film conveyance path 103, the narrow-width first laminated web PW1 is unrolled in step 1, and, in step 3, a position of a defect d1 existing in the first laminated web PW1, e.g., a value of the distance n1 from the leading edge of the first laminated web PW1, is recorded in the storage device 420. Then, in step 4, two adjacent slit lines for a defective sheet N1 are formed based on the recorded value n1 and, in step 5, the defective sheet N1 is peeled from the first laminated web PW1 and collected without being laminated to the organic EL display panel X.

On the other hand, in the first substrate conveyance path 102, in step 10, a first laminated sheet PL1 and containing no defect d cut out in the step 4 is laminated to the non-viewing side of the liquid crystal display panel X conveyed to the first station 101 in a posture where the long side of the liquid crystal display panel X is oriented to serve as the leading edge thereof, and, in step 11, to thereby form an intermediate laminated substrate 100. The first laminated sheet PL1 containing no defect d1 is cut out in the first film conveyance path 103, and an intermediate laminated substrate 100 is converted to the second substrate conveyance path 202 via the inter-path transfer section 30. In this process, the first surface protective film sheet F1 is peeled from the first laminated sheet PL1 comprised in the intermediate laminated substrate 100 to expose an outer surface of a retardation film sheet P1, and, in this state, the intermediate laminated substrate 100 is transferred to the second station, in step 20.

In response to this operation, in the second film conveyance path 203, the wide-width second laminated web PW2 is unrolled in step 13, and a second laminated sheet PL2 having no defect d2 is cut out in step 15. In synchronization with the above operation, in the second substrate conveyance path 202, the intermediate laminated substrate 100 being conveyed toward the second station 201 is turned by 90 degrees, and conveyed in a posture where the long side of the intermediate laminated substrate 100 is oriented to serve as the leading edge thereof. In the second station 201, the second laminated sheet PL2 is laminated to an outer surface of the retardation film sheet P1 of the intermediate laminated substrate 100, in step 23. In this way, the polarizing film sheet P2 are laminated the retardation film sheet P1 on the viewing side of the organic EL display panel X to thereby form an organic EL display device.

For example, instead of strictly controlling accuracy in an operation for cutting the rolls in such a manner that a roll width of one of the rolls has a dimension corresponding to a long side of a rectangular substrate, i.e., a display panel for use in the optical display device, and a roll width of the other roll has a dimension corresponding to a short side of the rectangular substrate, in the step of preliminarily producing at least two rolls of laminate webs for use in producing an optical display device, the present invention is directed to providing: a method comprising the steps of measuring widths of at least two laminate webs sequentially fed, respectively, from rolls thereof loaded in an apparatus for producing an optical display device, and forming two adjacent slit lines in each of the laminate webs, while controlling a roll width-dependent dimension of a resulting film sheet of each of the laminate webs, in such a manner that the measured width of one of the laminate webs becomes equal to a length of a film sheet of the other laminate web in a feed direction, and the measured width of the other laminate web becomes equal to a length of a film sheet of the one laminate web in the feed direction; and an apparatus for use in the method.

This makes it possible to reduce a narrow-frame of a display screen of a tablet information terminal having a screen size, for example, of 4 to 11 inches, to about 1 to 2 mm. In the existing conditions, it is required to realize a narrow-frame of about 1 to 2 mm, irrespective of screen size, even in 40 to 60-inch liquid crystal display devices. The present invention can sufficiently respond to such a need.

LIST OF REFERENCE SIGNS

X: rectangular substrate
A: laminated substrate
100: intermediate laminated substrate
200: laminated substrate product
R1: first roll
c1: first carrier film
PW1: first laminated web
e1, e1-1: pressure-sensitive adhesive layer
p1: first film
f1: first surface protective film
PL1: first laminated sheet
P1: first film sheet
F1: first surface protective film sheet
R2: second roll
c2: second carrier film
PW2: second laminated web
e2, e2-2: pressure-sensitive adhesive layer
p2: second film
f2: second surface protective film
PL2: second laminated sheet
P2: second film sheet
F2: second surface protective film sheet
d: defect
N, N1, N2: defective sheet
1: lamination apparatus for implementing present invention
10: first feed line
101: first station
102: first substrate conveyance path
103: first film conveyance path
104: first lamination device
110: first conveyance device
120: first slitting mechanism
130: first unrolling mechanism
140: first peeling mechanism
150: first eliminating mechanism
160: intermediate conveyance device
20: second feed line
201: second station
202: second substrate conveyance path
203: second film conveyance path
204: second lamination device
210: second conveyance device
220: second slitting mechanism
230: second unrolling mechanism
240: second peeling mechanism
30: inter-path transfer section
33, 37: turning device
34: peeling device
400: controller
410: information processing device
420: storage device

The invention claimed is:

1. A method for sequentially laminating, to one surface of a rectangular substrate, at least two different types of film sheets each having a shape identical or similar to a rectangular shape of the substrate, to thereby form a laminated substrate, comprising the steps of:
providing (at least) a first roll formed by winding a first laminated web constructed such that a first film continuously extending in a longitudinal direction thereof and having a width a corresponding to one of a long side and a short side of the substrate is laminated to at least a first carrier film through a pressure-sensitive adhesive layer, and
a second roll formed by winding a second laminated web constructed such that a second film continuously extending in a longitudinal direction thereof and having a width b corresponding to the remaining one of the long side and the short side of the substrate is laminated to at least a second carrier film through a pressure-sensitive adhesive layer;
performing, in a first feed line comprised in a lamination apparatus and loaded with the first roll, a process comprising:
unrolling the first laminated web from the first roll;
successively forming a plurality of slit lines each extending in a direction orthogonal to a feed direction of the first laminated web, in a region of the first laminated web on the first carrier film, in such a manner as to allow a distance between adjacent ones of the slit lines to become equal to a distance b1 corresponding to a preliminarily-measured width of the second laminated web, to thereby form, between the adjacent slit lines, a first film sheet including a pressure-sensitive adhesive layer piece;

peeling the first film sheet including the pressure-sensitive adhesive layer piece, from the first laminated web;
laminating the peeled first film sheet to the substrate transferred to the first feed line, through the pressure-sensitive adhesive layer piece; and
transferring the resulting substrate to a second feed line; and
performing, in the second feed line comprised in the lamination apparatus and loaded with the second roll, a process comprising:
unrolling the second laminated web from the second roll;
successively forming a plurality of slit lines each extending in a direction orthogonal to a feed direction of the second laminated web, in a region of the second laminated web on the second carrier film, in such a manner as to allow a distance between adjacent ones of the slit lines to become equal to a distance a1 corresponding to a preliminarily-measured width of the second laminated web, to thereby form, between the adjacent slit lines, a second film sheet including a pressure-sensitive adhesive layer piece;
peeling the second film sheet including the pressure-sensitive adhesive layer piece, from the second laminated web; and
superimposingly laminating the peeled second film sheet to an outer surface of the first film sheet on the substrate transferred to the second feed line, through the pressure-sensitive adhesive layer piece.

2. The method as recited in claim 1, wherein the substrate transferred to the first feed line is conveyed in a posture where one of the long and short sides of the substrate is oriented to serve as a leading edge thereof, and the substrate transferred to the second feed line is conveyed in a posture where the remaining one of the long and short sides of the substrate is oriented to serve as a leading edge thereof.

3. The method as recited in claim 1, wherein
the distance b1 corresponding to a width of the second laminated web is a value obtained by measuring a width of the second laminated web in the second roll loaded in the second feed line, and
the distance a1 corresponding to a width of the first laminated web is a value obtained by measuring a width of the first laminated web in the first roll loaded in the second feed line.

4. The method as recited in claim 1, wherein
the distance b1 corresponding to a width of the second laminated web is set to become a distance of not less than the preliminarily-measured width of the second laminated web, and
the distance a1 corresponding to a width of the first laminated web is set to become a distance of not greater than the preliminarily-measured width of the first laminated web.

5. The method as recited in claim 1, wherein
the first laminated web comprises a first surface protective film laminated to an outer surface of the first film laminated to the first carrier film through the pressure-sensitive adhesive layer, and wherein
the process to be performed in the first feed line comprises:
successively forming a plurality of slit lines each extending in the direction orthogonal to the feed direction of the first laminated web, in the region of the first laminated web on the first carrier film, in such a manner as to allow a distance between adjacent ones of the slit lines to become equal to a distance b1 corresponding to a width of the second laminated web, to thereby form, between the adjacent slit lines, a first laminated sheet comprising a first surface protective film sheet and a first film sheet including a pressure-sensitive adhesive layer piece;
peeling the first laminated sheet including the pressure-sensitive adhesive layer piece, from the first laminated web;
laminating the peeled first laminated sheet to one surface of the substrate transferred to the first feed line, through the first the pressure-sensitive adhesive layer piece; and
transferring the resulting substrate to the second feed line, and
the process to be performed in the second feed line comprises:
peeling the second film sheet including the pressure-sensitive adhesive layer piece, from the second laminated web;
peeling the first surface protective film sheet from the first film sheet of the first laminated sheet laminated on the one surface of the substrate, to expose the first film sheet; and
superimposingly laminating the peeled second film sheet to an outer surface of the exposed first film sheet through the pressure-sensitive adhesive layer piece.

6. The method as recited in claim 1, wherein
the second laminated web comprises a second surface protective film laminated to an outer surface of the second film laminated to the second carrier film through the pressure-sensitive adhesive layer, and wherein
the process to be performed in the second feed line when the substrate is transferred to the second feed line comprises:
successively forming a plurality of slit lines each extending in the direction orthogonal to the feed direction of the second laminated web, in the region of the second laminated sheet on the second carrier film, in such a manner as to allow a distance between adjacent ones of the slit lines to become equal to a distance a1 corresponding to a width of the first laminated web, to thereby form, between the adjacent slit lines, an integral piece of second laminated sheet comprising a second surface protective film sheet and a second film sheet including a pressure-sensitive adhesive layer piece;
peeling the second laminated sheet from the second laminated web to expose the pressure-sensitive adhesive layer piece; and
superimposingly laminating the peeled second laminated sheet to an outer surface of the first film sheet on one surface of the substrate, through the exposed pressure-sensitive adhesive layer piece.

7. The method as recited in claim 1, wherein
the substrate is composed of an organic EL display panel, and the first film including the pressure-sensitive adhesive layer and laminated to the first carrier film therethrough, and the second film including the pressure-sensitive adhesive layer and laminated to the second carrier film therethrough, which are used in at least a pair, are composed, respectively, of a retardation film, and a polarizing film, and wherein
the process to be performed in the first feed line comprises:
forming a retardation film sheet including a pressure-sensitive adhesive layer piece, between the adjacent slit lines in the region of the first laminated web on the first carrier film;

peeling the retardation film sheet including the pressure-sensitive adhesive layer piece, from the first carrier film;

laminating the peeled retardation film sheet to a viewing side of the organic EL display panel transferred to the first feed line, through the pressure-sensitive adhesive layer piece; and transferring the resulting organic EL display panel to the second feed line; and the process to be performed in the second feed line comprises:

forming a polarizing film sheet including a pressure-sensitive adhesive layer piece, between the adjacent slit lines in the region of the second laminated web on the second carrier film;

peeling the polarizing film sheet including the pressure-sensitive adhesive layer piece, from the second laminated web; and superimposingly laminating the peeled polarizing film sheet to an outer surface of the retardation film sheet laminated to the viewing side of the organic EL display panel transferred to the second feed line, through the pressure-sensitive adhesive layer piece.

8. The method as recited in claim 7, wherein
the retardation film including the pressure-sensitive adhesive layer and laminated to the first carrier film therethrough, and the polarizing film including the pressure-sensitive adhesive layer and laminated to the second carrier film therethrough, which are used in at least a pair, comprise, respectively, a first surface protective film laminated to an outer surface of the retardation film, and a second surface protective film laminated to an outer surface of the polarizing film, and wherein the process to be performed in the first feed line comprises:

forming a first laminated sheet comprising a first surface protective film sheet and a retardation film sheet including a pressure-sensitive adhesive layer piece, between the adjacent slit lines in the region of the first laminated web on the first carrier film;

peeling the first laminated sheet from the first carrier film;

laminating the peeled first laminated sheet to the viewing side of the organic EL display panel transferred to the first feed line, through the pressure-sensitive adhesive layer piece; and transferring the resulting organic EL display panel to the second feed line, and the process to be performed in the second feed line comprises:

forming a second laminated sheet comprising a second surface protective film sheet and a polarizing film sheet including a pressure-sensitive adhesive layer piece, between the adjacent slit lines in the region of the second laminated web on the second carrier film;

peeling the second laminated sheet from the second carrier film;

peeling the first surface protective film sheet from the retardation film sheet of the first laminated sheet laminated on the viewing side of the organic EL display panel, to expose the retardation film sheet; and superimposingly laminating the peeled second laminated sheet to an outer surface of the exposed retardation film sheet, through the pressure-sensitive adhesive layer piece.

9. The method as recited in claim 7, wherein
each of the retardation film including the pressure-sensitive adhesive layer and constituting the first laminated web, and the polarizing film including the pressure-sensitive adhesive layer and constituting the second laminated web, is preliminarily subject to inspection to detect a defect existing therein, and wherein the process to be performed in the first feed line comprises, when a defect exists in the retardation film including the pressure-sensitive adhesive layer, forming an upstream slit line in the region of the first laminated web on the first carrier film, at a position spaced apart from a position of the defect on an upstream side in the feed direction by a given distance, to thereby form a first defective sheet between the upstream slit line and a downstream slit line formed just before the upstream slit line so as to allow the first defective sheet to be ejected from the first feed line without being laminated to the organic EL display panel, and the process to be performed in the second feed line comprises, when a defect exists in the polarizing film including the pressure-sensitive adhesive layer, forming an upstream slit line in the region of the second laminated web on the second carrier film, at a position spaced apart from a position of the defect on an upstream side in the feed direction by a given distance, to thereby form a second defective sheet between the upstream slit line and a downstream slit line formed just before the upstream slit line so as to allow the second defective sheet to be ejected from the second feed line without being laminated to the organic EL display panel.

10. The method as recited in claim 1, wherein
the substrate is composed of a liquid crystal display panel, and the first film including the pressure-sensitive adhesive layer and laminated to the first carrier film therethrough, and the second film including the pressure-sensitive adhesive layer and laminated to the second carrier film therethrough, which are used in at least a pair, are composed, respectively, of an absorptive polarizing film having a width corresponding one of a long side and a short side of the liquid crystal display panel and having an transmission axis in a direction orthogonal to a longitudinal direction thereof, and a reflective polarizing film having a width corresponding the remaining one of the long and short sides of the liquid crystal display panel and having an transmission axis in a longitudinal direction thereof, and wherein the process to be performed in the first feed line comprises:

forming an absorptive polarizing film sheet including a pressure-sensitive adhesive layer piece, between the adjacent slit lines in the region of the first laminated web on the first carrier film;

peeling the absorptive polarizing film sheet including the pressure-sensitive adhesive layer piece, from the first carrier film;

laminating the peeled absorptive polarizing film sheet to a non-viewing side of the liquid crystal display panel transferred to the first feed line, through the pressure-sensitive adhesive layer piece; and transferring the resulting liquid crystal display panel to the second feed line; and the process to be performed in the second feed line comprises:

forming a reflective polarizing film sheet including a pressure-sensitive adhesive layer piece, between the adjacent slit lines in the region of the second laminated web on the second carrier film;

peeling the reflective polarizing film sheet including the pressure-sensitive adhesive layer piece, from the second carrier film; and superimposingly laminating the peeled reflective polarizing film sheet to an outer surface of the absorptive polarizing film sheet laminated to the liquid crystal display panel transferred to the second feed line, through the pressure-sensitive adhesive layer piece, in such a manner to allow the transmission axis of the absorptive polarizing film sheet and the transmission axis of the reflective polarizing film sheet to become parallel to each other.

11. The method as recited in claim 10, wherein the absorptive polarizing film including the pressure-sensitive adhesive layer and laminated to the first carrier film therethrough, and the reflective polarizing film including the pressure-sensitive adhesive layer and laminated to the second carrier film therethrough, which are used in at least a pair, comprise, respectively, a first surface protective film laminated to an outer surface of the absorptive polarizing film, and a second surface protective film laminated to an outer surface of the reflective polarizing film, and wherein the process to be performed in the first feed line comprises:

forming a first laminated sheet comprising a first surface protective film sheet and an absorptive polarizing film sheet including a pressure-sensitive adhesive layer piece, between the adjacent slit lines in the region of the first laminated web on the first carrier film;

peeling the first laminated sheet from the first carrier film;

laminating the peeled first laminated sheet to the non-viewing side of the liquid crystal display panel transferred to the first feed line, through the pressure-sensitive adhesive layer piece; and transferring the resulting liquid crystal display panel to the second feed line, and the process to be performed in the second feed line comprises:

forming a second laminated sheet comprising a second surface protective film sheet and a reflective polarizing film sheet including a pressure-sensitive adhesive layer piece, between the adjacent slit lines in the region of the second laminated web on the second carrier film;

peeling the second laminated sheet from the second carrier film;

peeling the first surface protective film sheet from the absorptive polarizing film sheet of the first laminated sheet laminated on the non-viewing side of the liquid crystal display panel to expose the absorptive polarizing film sheet; and superimposingly laminating the peeled second laminated sheet to an outer surface of the exposed absorptive polarizing film sheet, through the pressure-sensitive adhesive layer piece, in such a manner to allow the transmission axis of the absorptive polarizing film sheet and the transmission axis of the reflective polarizing film sheet to become parallel to each other.

12. The method as recited in claim 10, wherein the absorptive polarizing film including the pressure-sensitive adhesive layer and constituting the first laminated web is preliminarily subject to inspection to detect a defect existing therein, and wherein the process to be performed in the first feed line comprises, when a defect exists in the absorptive polarizing film including the pressure-sensitive adhesive layer, forming an upstream slit line in the region of the first laminated web on the first carrier film, at a position spaced apart from a position of the defect on an upstream side in the feed direction by a given distance, to thereby form a first defective sheet between the upstream slit line and a downstream slit line formed just before the upstream slit line so as to allow the first defective sheet to be ejected from the first feed line without being laminated to the liquid crystal display panel.

13. The method as recited in claim 10, wherein an additional absorptive polarizing film sheet is further laminated to a viewing side of the liquid crystal display panel, in such a manner that it has a transmission axis extending in orthogonal relation to the transmission axis of the absorptive polarizing film constituting the first laminated sheet formed on the non-viewing side of the liquid crystal display panel.

14. An apparatus for sequentially laminating, to one surface of a rectangular substrate, at least two different types of film sheets each having a shape identical or similar to a rectangular shape of the substrate, to thereby form a laminated substrate, comprising:

a first feed line which is loaded with a first roll formed by winding a first laminated web constructed such that a first film continuously extending in a longitudinal direction thereof and having a width a corresponding to one of a long side and a short side of the substrate is laminated to at least a first carrier film through a pressure-sensitive adhesive layer;

a second feed line which is loaded with a second roll formed by winding a second laminated web constructed such that a second film continuously extending in a longitudinal direction thereof and having a width b corresponding to the remaining one of the long side and the short side of the substrate is laminated to at least a second carrier film through a pressure-sensitive adhesive layer;

a first station for lamination, provided in the first feed line at a position spaced apart from one end of the first feed line by a first given distance;

a first substrate conveyance path provided in the first feed line to extend from the one end of the first feed line over the first given distance, and provided with a first conveyance device configured to convey the substrate toward the first station;

a first film conveyance path provided with a first unrolling mechanism configured to unroll the first laminated web from the first roll to convey the first laminated web toward the first station;

a first slitting mechanism provided in the first film conveyance path and configured to successively form a plurality of slit lines each extending in a direction orthogonal to a feed direction of the first laminated web, in a region of the first laminated web on the first carrier film, in such a manner as to allow a distance between adjacent ones of the slit lines to become equal to a distance b1 corresponding to a preliminarily-measured width of the second laminated web, to thereby form, between the adjacent slit lines, a first film sheet including a pressure-sensitive adhesive layer piece;

a first lamination device provided in the first station, wherein the first lamination device being provided with a first peeling mechanism for peeling the first film sheet from the first laminated web and configured to laminate the peeled first film sheet to one surface of the substrate conveyed to the first station to thereby form an intermediate laminated substrate;

an inter-path transfer section provided with an intermediate conveyance device configured to transfer the resulting intermediate laminated substrate to the second feed line;

a second station for lamination, provided in the second feed line at a position spaced apart from one end of the second feed line by a second given distance;

a second film conveyance path provided with a second unrolling mechanism configured to unroll the second laminated web from the second roll to convey the second laminated web toward the second station;

a second slitting mechanism provided in the second film conveyance path and configured to successively form a plurality of slit lines each extending in a direction orthogonal to a feed direction of the second laminated web, in a region of the second laminated web on the second carrier film, in such a manner as to allow a distance between adjacent ones of the slit lines to become equal to a distance a1 corresponding to a preliminarily-measured width of the first laminated web, to thereby form, between the adjacent slit lines, a second film sheet including a pressure-sensitive adhesive layer piece;

a second lamination device provided in the second station, wherein the second lamination device being provided with a second peeling mechanism for peeling the second film sheet from the second laminated web and configured to superimposingly laminate the peeled second film sheet to an outer surface of the first film sheet on the intermediate laminated substrate conveyed to the second station to thereby form a laminated substrate; and a second substrate conveyance path provided with a second conveyance device configured to convey the laminated substrate, wherein the apparatus further comprises a controller configured to interlockingly operate at least the first conveyance device, the first unrolling mechanism, the first slitting mechanism, the first lamination device, the intermediate conveyance device, the second unrolling mechanism, the second slitting mechanism, the second lamination device, and the second conveyance device.

15. The apparatus as recited in claim 14, wherein the intermediate conveyance device comprising a turning device for turning the intermediate laminated substrate by 90 degrees.

16. The apparatus as recited in claim 14, wherein the first laminated web comprises a first surface protective film laminated to an outer surface of the first film laminated to the first carrier film through the pressure-sensitive adhesive layer, and wherein the apparatus is operable, in the first feed line, to:
cause the first slitting mechanism to successively form a plurality of slit lines each extending in the direction orthogonal to the feed direction of the first laminated web, in the region of the first laminated web on the first carrier film, in such a manner as to allow a distance between adjacent ones of the slit lines to become equal to a distance b1 corresponding to a width of the second laminated web, to thereby form, between the adjacent slit lines, a first laminated sheet comprising a first surface protective film sheet and a first film sheet including a pressure-sensitive adhesive layer piece; and cause the first lamination device to peel the first laminated sheet including the pressure-sensitive adhesive layer piece, from the first carrier film by the first peeling mechanism, and laminate the peeled first laminated sheet to one surface of the substrate conveyed to the first station to thereby form a precursor structure of an intermediate laminated substrate, and wherein the apparatus further comprises a protective film sheet peeling device provided in either one of the inter-path transfer section or the second feed line apparatus and configured to peel the first surface protective film sheet from the first laminated sheet of the precursor structure to thereby form the intermediate laminated substrate, and wherein the apparatus is operable, in the second feed line, to:
cause the second slitting mechanism to successively form a second film sheet including a pressure-sensitive adhesive layer piece between adjacent slit lines in the region of the second laminated web on the second carrier film; and cause the second lamination device to peel the second film sheet including the pressure-sensitive adhesive layer piece, from the second carrier film by the second peeling device, and superimposingly laminate the peeled second film sheet to an outer surface of the first film sheet of the intermediate laminated substrate conveyer to the second station.

17. The apparatus as recited in claim 14, wherein the second laminated web comprises a second surface protective film laminated to an outer surface of the second film laminated to the second carrier film through the pressure-sensitive adhesive layer, and wherein:

the apparatus is operable to transfer the intermediate laminated substrate formed in the first line, to the second feed line, and, in the second feed line, to:
cause the second slitting mechanism to successively form a plurality of slit lines each extending in the direction orthogonal to the feed direction of the second laminated web, in the region of the second laminated sheet on the second carrier film, in such a manner as to allow a distance between adjacent ones of the slit lines to become equal to a distance a1 corresponding to a width of the first laminated web, to thereby form, between the adjacent slit lines, a second laminated sheet comprising a second surface protective film sheet and a second film sheet including a pressure-sensitive adhesive layer piece; and cause the second lamination device to peel the second laminated sheet from the second carrier film by the second peeling mechanism, and superimposingly laminate the peeled second laminated sheet to an outer surface of the first film sheet on the intermediate laminated substrate conveyed to the second station, through the exposed pressure-sensitive adhesive layer piece.

18. The apparatus as recited in claim 14, wherein the substrate is composed of an organic EL display panel, and the first film laminated to the first carrier film through the pressure-sensitive adhesive layer included therein, and the second film laminated to the second carrier film through the pressure-sensitive adhesive layer included therein, which are used in at least a pair, are composed, respectively, of a retardation film, and a polarizing film, and wherein:

the apparatus is operable, in the first feed line, to:
cause the first slitting mechanism to form a retardation film sheet including a pressure-sensitive adhesive layer piece, between the adjacent slit lines in the region of the first laminated web on the first carrier film;
cause the first lamination device to peel the retardation film sheet including the pressure-sensitive adhesive layer piece, from the first carrier film by the first peeling mechanism, and laminate the peeled retardation film sheet to a viewing side of the organic EL display panel conveyed to the first station, to thereby form an intermediate laminate-organic EL display panel; and
transfer the intermediate laminate-organic EL display panel to the second feed line,
and, in the second feed line, to:
cause the second slitting mechanism to form a polarizing film sheet including a pressure-sensitive adhesive layer piece, between the adjacent slit lines in the region of the second laminated web on the second carrier film; and
cause the second lamination device to peel the polarizing film sheet including the pressure-sensitive adhesive layer piece, from the second carrier film by the second peeling mechanism, and superimposingly laminate the peeled polarizing film sheet to an outer surface of the retardation film sheet on the intermediate laminate-organic EL display panel conveyed to the second station.

19. The apparatus as recited in claim 18, wherein
the retardation film laminated to the first carrier film through the pressure-sensitive adhesive layer used in at least a pair, comprises a first surface protective film laminated to an outer surface of the retardation film P1 and wherein:
the apparatus is operable, in the first feed line, to:
cause the first slitting mechanism to form a first laminated sheet comprising a first surface protective film sheet and a retardation film sheet including a pressure-sensitive adhesive layer piece, between the adjacent slit lines in the region of the first laminated web on the first carrier film;
cause the first lamination device to peel the first laminated sheet including the pressure-sensitive adhesive layer piece, from the first carrier film by the first peeling mechanism, and laminate the peeled first laminated sheet to a viewing side of the organic EL display panel conveyed to the first station to thereby form a precursor structure of an intermediate laminate-organic EL display panel; and
transfer the precursor structure to the second feed line, and wherein
the apparatus further comprises a protective film sheet peeling device provided in either one of the inter-path transfer section or the second feed line and configured to peel the first surface protective film sheet from the first laminated sheet of the precursor structure to thereby form the intermediate laminate-organic EL display panel, and wherein
the apparatus is operable, in the second feed line, to:
cause the second slitting mechanism to form a second film sheet including a pressure-sensitive adhesive layer piece, between adjacent slit lines in the region of the second laminated web on the second carrier film; and
cause the second lamination device to peel the second film sheet including the pressure-sensitive adhesive layer piece, from the second carrier film by the second peeling device, and laminate the peeled second film sheet to an outer surface of the first film sheet of the intermediate laminate-organic EL display panel conveyed to the second station.

20. The apparatus as recited in claim 18, wherein
each of the retardation film including the pressure-sensitive adhesive layer and constituting the first laminated web, and the polarizing film including the pressure-sensitive adhesive layer and constituting the second laminated web, is preliminarily subject to inspection to detect a defect existing therein, and wherein
the apparatus is operable, in the first feed line
when a defect exists in the retardation film including the pressure-sensitive adhesive layer, to:
cause the first slitting mechanism to, based on information about a position of the defect preliminarily stored in a storage device, form an upstream slit line in the region of the first laminated web on the first carrier film, at a position spaced apart from the position of the defect on an upstream side in the feed direction by a given distance, to thereby form a first defective sheet between the upstream slit line and a downstream slit line formed just before the upstream slit line; and
cause a first ejection device provided interlockingly with the first lamination device to eject the first defective sheet from the first feed line without laminating the first defective sheet to the organic EL display panel,
and, in the second feed line
when a defect exists in the polarizing film including the pressure-sensitive adhesive layer, to:
cause the second slitting mechanism to, based on information about a position of the defect preliminarily stored in a storage device, form an upstream slit line in the region of the second laminated web on the second carrier film, at a position spaced apart from the position of the defect on an upstream side in the feed direction by a given distance, to thereby form a second defective sheet between the upstream slit line and a downstream slit line formed just before the upstream slit line; and
cause a second ejection device provided interlockingly with the second lamination device to eject the second defective sheet from the second feed line without laminating the second defective sheet to the organic EL display panel.

21. The apparatus as recited in claim 14, wherein
the substrate is composed of a liquid crystal display panel, and
the first film including the pressure-sensitive adhesive layer and laminated to the first carrier film therethrough, and the second film including the pressure-sensitive adhesive layer and laminated to the second carrier film therethrough, which are used in at least a pair, are composed, respectively, of an absorptive polarizing film having an transmission axis in a direction orthogonal to a longitudinal direction thereof, and a reflective polarizing film having an transmission axis in a longitudinal direction thereof, and wherein the apparatus is operable, in the first feed line, to:
  cause the first slitting mechanism to form an absorptive polarizing film sheet including a pressure-sensitive adhesive layer piece, between the adjacent slit lines in the region of the first laminated web on the first carrier film;
  cause the first lamination device to peel the absorptive polarizing film sheet including the pressure-sensitive adhesive layer piece, from the first carrier film by the first peeling mechanism, and laminate the peeled absorptive polarizing film sheet to a non-viewing side of the liquid crystal display panel conveyed to the first station, to thereby form an intermediate laminate-liquid crystal display panel; and
  transfer the intermediate laminate-liquid crystal display panel to the second feed line,
and, in the second feed line, to:
  cause the second slitting mechanism to form a reflective polarizing film sheet including a pressure-sensitive adhesive layer piece, between the adjacent slit lines in the region of the second laminated web on the second carrier film; and
  cause the second lamination device to peel the reflective polarizing film sheet including the pressure-sensitive adhesive layer piece, from the second carrier film by the second peeling mechanism, and superimposingly laminate the peeled reflective polarizing film sheet to an outer surface of the absorptive polarizing film sheet laminated to the intermediate laminate-liquid crystal display panel, in such a manner to allow the transmission axis of the absorptive polarizing film sheet and the transmission axis of the reflective polarizing film sheet to become parallel to each other.

22. The apparatus as recited in claim 21, wherein
the absorptive polarizing film including the pressure-sensitive adhesive layer and constituting the first laminated web is preliminarily subject to inspection to detect a defect existing therein, and wherein
the apparatus is operable, in the first feed line
when a defect exists in the absorptive polarizing film including the pressure-sensitive adhesive layer, to:
  cause the first slitting mechanism to, based on information about a position of the defect preliminarily stored in a storage device, form an upstream slit line in the region of the first laminated web on the first carrier film, at a position spaced apart from the position of the defect on an upstream side in the feed direction by a given distance, to thereby form a defective sheet between the upstream slit line and a downstream slit line formed just before the upstream slit line; and
  cause a first ejection device provided interlockingly with the first lamination device to eject the defective sheet from the first feed line without laminating the defective sheet to the liquid crystal display panel.

23. The apparatus as recited in claim 21,
which is operable to laminate an additional absorptive polarizing film sheet to a viewing side of the liquid crystal display panel, in such a manner that it has a transmission axis extending in orthogonal relation to the transmission axis of the absorptive polarizing film constituting the first laminated sheet formed on the non-viewing side of the liquid crystal display panel.

* * * * *